(12) United States Patent
Saccomanno et al.

(10) Patent No.: US 7,806,579 B2
(45) Date of Patent: Oct. 5, 2010

(54) LUMINAIRE HAVING A TWO-WAY WAVEGUIDE

(75) Inventors: Robert J. Saccomanno, Montville, NJ (US); Ivan B. Steiner, Ridgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 153 days.

(21) Appl. No.: 11/749,332

(22) Filed: May 16, 2007

(65) Prior Publication Data

US 2008/0239749 A1    Oct. 2, 2008

Related U.S. Application Data

(63) Continuation-in-part of application No. 11/693,943, filed on Mar. 30, 2007, now abandoned.

(51) Int. Cl.
F21V 7/04 (2006.01)
(52) U.S. Cl. ............ 362/606; 362/616; 362/619; 362/621
(58) Field of Classification Search ......... 362/606–607, 362/616, 621, 617–619; 349/65
See application file for complete search history.

(56) References Cited

U.S. PATENT DOCUMENTS

| | | | |
|---|---|---|---|
| 3,864,905 A | 2/1975 | Richardson | |
| 4,257,084 A | 3/1981 | Reynolds | |
| 5,202,950 A | 4/1993 | Arego et al. | |
| 5,381,309 A | 1/1995 | Borchardt | |
| 5,587,816 A | 12/1996 | Gunjima et al. | |
| 5,799,126 A | 8/1998 | Nagatani et al. | |
| 6,002,829 A | 12/1999 | Winston et al. | |
| 6,239,851 B1 | 5/2001 | Hatazawa et al. | |
| 6,334,690 B1 | 1/2002 | Ohkawa | |
| 6,464,365 B1 | 10/2002 | Gunn et al. | |
| 2002/0149924 A1 | 10/2002 | Falicoff et al. | |
| 2006/0262376 A1* | 11/2006 | Mather et al. | ............... 359/248 |

FOREIGN PATENT DOCUMENTS

| | | |
|---|---|---|
| WO | 0184046 A1 | 11/2001 |
| WO | 02097324 A1 | 12/2002 |
| WO | 03083530 A1 | 10/2003 |

OTHER PUBLICATIONS

PCT Search report PCT/US2008/063528 dated Aug. 26, 2008.

* cited by examiner

*Primary Examiner*—Jason Moon Han
(74) *Attorney, Agent, or Firm*—Ingrassia Fisher & Lorenz, P.C.

(57) ABSTRACT

A luminaire includes a waveguide having first and second opposing ends and first and second opposing sides between the first and second ends. The waveguide is configured to totally internally reflect light propagating through the waveguide in a first direction and direct light propagating through the waveguide in a second direction through at least one of the first and second sides. A reflective body is coupled to the second end of the waveguide and configured to reflect light propagating towards the second end of the waveguide such that the light propagates towards the first end of the waveguide.

20 Claims, 23 Drawing Sheets

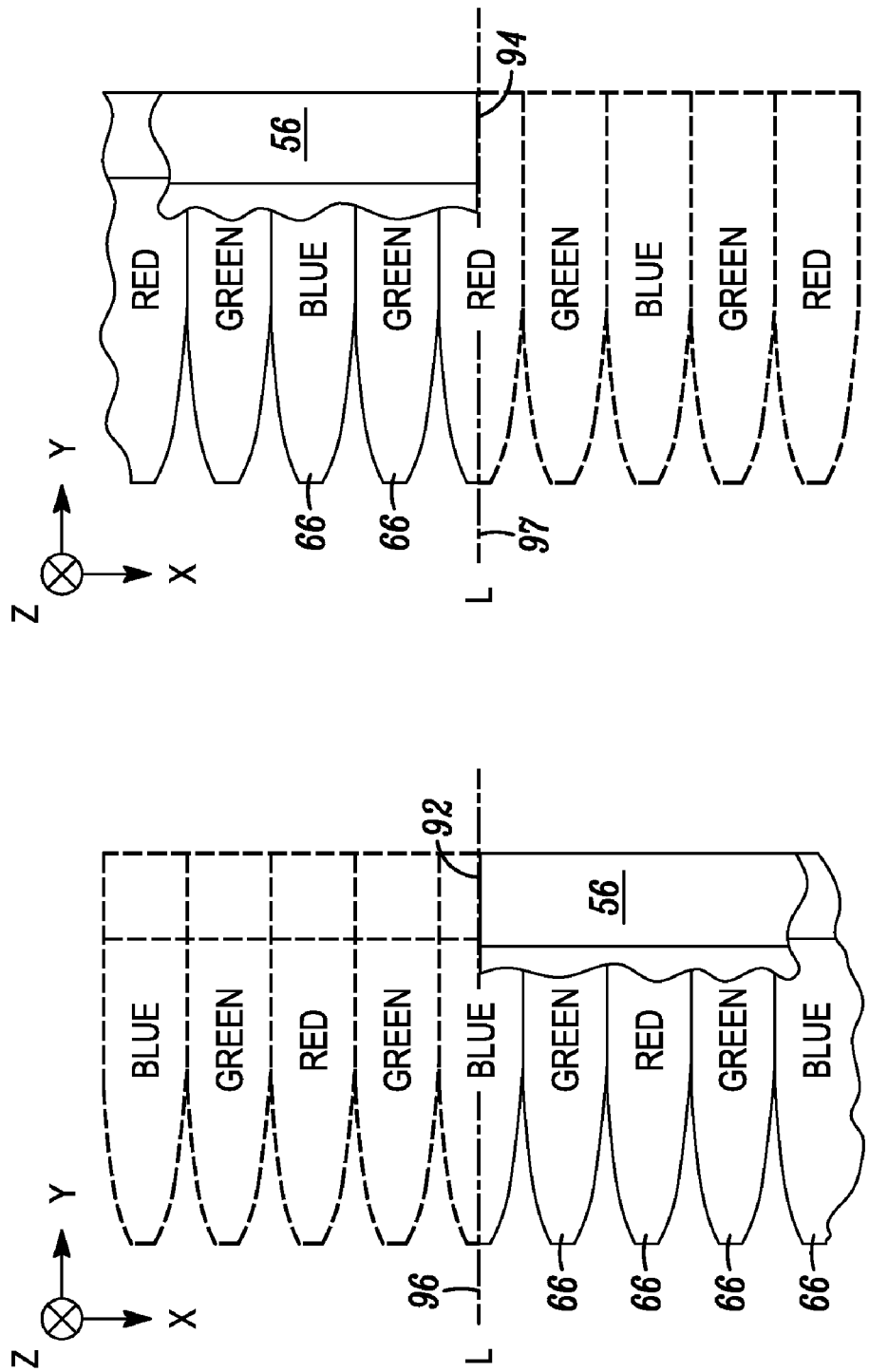

LUMINAIRE HAVING A TWO-WAY WAVEGUIDE

CROSS-REFERENCE TO RELATED APPLICATIONS

This is a continuation-in-part of application Ser. No. 11/693,943 filed Mar. 30, 2007 now abandoned.

TECHNICAL FIELD

The present invention generally relates to luminaires such as those used the in backlights in flat panel display systems, and more particularly relates to a two-way waveguide used in a luminaires.

BACKGROUND

Liquid crystal displays (LCDs), and other backlight devices, are currently used in a wide, and ever increasing, variety of commercial, residential, and military technologies and applications. As the need for smaller, more compact displays increases, so does the difficulty in providing such a display with acceptable performance characteristics, such as spatial, angular, and luminance uniformity.

Spatial uniformity requires uniformity in the luminous flux per unit area projected from the display over the surface area of the display. Angular uniformity requires the directional shape of luminous flux per steradian projected per unit area be uniform over the display surface area for viewing angles within a wide, two-dimensional viewing angle range. The spatial uniformity of projected flux, or light, is without regard to its angular uniformity characteristics, and the angular uniformity of projected flux is without regard to its spatial uniformity characteristics. Luminance uniformity encompasses both spatial and angular uniformity characteristics and requires that the light projected from different areas of the display surface be both spatially and angularly uniform within a wide viewing angle range.

Accordingly, it is desirable to provide a display system, or luminaire, with improved spatial, angular, and luminance uniformity. In addition, it is desirable to provide such a display system with a compact thickness. Furthermore, other desirable features and characteristics of the present invention will become apparent from the subsequent detailed description and the appended claims, taken in conjunction with the accompanying drawings and the foregoing technical field and background.

BRIEF SUMMARY

According to one aspect of the present invention, a luminaire is provided. The luminaire includes a waveguide having first and second opposing ends and first and second substantially parallel opposing sides between the first and second ends. The waveguide is configured to totally internally reflect light propagating between the first and second ends with a first property and direct light propagating between the first and second ends with a second property through at least one of the first and second sides. An optical modifier is coupled to the second end of the waveguide and configured to reflect and modify light propagating towards the second end of the waveguide such that the light propagates towards the first end of the waveguide with the second property.

According to another aspect of the present invention, a luminaire is provided. The luminaire includes a waveguide having first and second opposing ends and first and second opposing sides between the first and second ends. An extraction material is adjacent to one of the first and second sides of the waveguide and forms an interface between the waveguide and the extraction material. The waveguide and the extraction material are configured such that when light enters the first end of the waveguide and propagates through the waveguide in a first direction with a first property, the light is totally internally reflected by selected portions of the interface. A reflective body is adjacent to the second end of the waveguide and configured to reflect and modify the light propagating through the waveguide in the first direction such that the light propagates through the waveguide in a second direction with a second property. The waveguide and the extraction material are further configured such that the light propagating through the waveguide in the second direction with the second property is transmitted by the selected portions of the interface and is directed through at least one of the first and second sides of the waveguide.

According to a further aspect of the invention, a luminaire is provided. The luminaire includes a waveguide having first and second opposing ends and first and second opposing sides between the first and second ends. An extraction layer is on one of the first and second sides of the waveguide. An adhesive layer is between the waveguide and the extraction layer. The adhesive layer has a first end adjacent to the first end of the waveguide and a second end adjacent to the second end of the waveguide and forms an interface between the waveguide and the adhesive layer. The adhesive layer includes adhesive material portions and air gap portions. A ratio of the area of air gap portions to the area of the adhesive material portions decreases as the adhesive layer extends away from the second end to the first end thereof. The waveguide and the adhesive layer are configured such that when light propagates through the waveguide in a first direction, the light is totally internally reflected by the interface. A reflective body is adjacent to at least one of the first and second ends of the waveguide and configured to reflect the light propagating through the waveguide in the first direction such that the light propagates through the waveguide in a second direction. The waveguide, the adhesive layer, and the extraction layer are further configured such that the light propagating through the waveguide in the second direction is transmitted by the interface and is directed through at least one of the first and second sides of the waveguide.

BRIEF DESCRIPTION OF THE DRAWINGS

The present invention will hereinafter be described in conjunction with the following drawing figures, wherein like numerals denote like elements.

FIGS. 7 and 8 are top plan views the upper waveguide and the lower waveguide illustrating the relationship between edge sections thereof.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be noted that FIGS. 1-39 are merely illustrative and may not be drawn to scale. It should also be noted that in several of the drawings a Cartesian coordinate system, including x, y, and z axes and/or directions, is shown to clarify the relative orientation of the components, according to the various embodiments.

FIG. 1 to FIG. 39 illustrate embodiments of luminaires, according to various aspects of the present invention. In one embodiment, the luminaire includes an upper waveguide having first and second opposing ends, first and second substantially parallel opposing sides between the first and second ends, and first and second opposing edges between the first and second opposing sides. The upper waveguide is configured to totally internally reflect light propagating through the upper waveguide in a first direction from the first end toward the second end and direct light propagating through the upper waveguide in a second direction from the second end toward the first end. A reflective body is coupled to the second end of the upper waveguide and configured to reflect light propagating towards the second end of the upper waveguide such that the reflected light propagates towards the first end of the waveguide. That is, the light makes two passes through the upper waveguide. The first pass completes the color mixing and the second pass allows light to transmit into the extraction film layer and be extracted.

Figure 1:
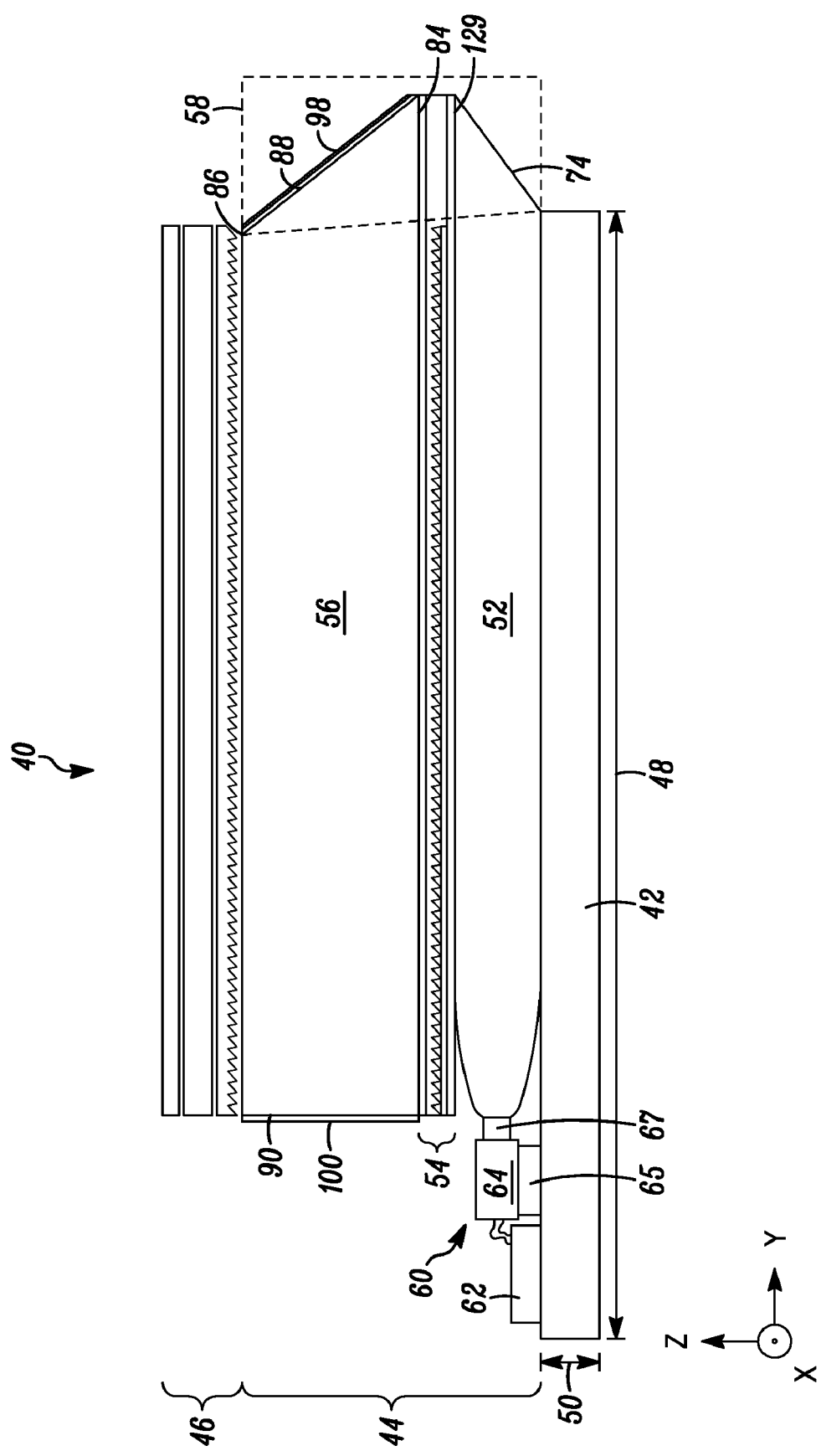
FIG. 1 is a side view of a display system according to one embodiment of the present invention including a lower and upper waveguide.

According to one embodiment illustrated in FIG. 1, a flat panel display system 40 is provided. The display system 40 includes a support substrate 42, a backlight subsystem 44 (or backlight), and a liquid crystal display (LCD) assembly 46. The backlight subsystem 44 is connected to an upper side of the substrate 42 and includes a lower waveguide 52, an extraction layer 54, an upper waveguide 56, a reflection assembly 58, a light emitting diode (LED) array 60, and controller subsystem 62.

Light is emitted by the LED array 60 into the lower waveguide 52. The light is collimated as it passes through the lower waveguide 52 and is reflected at an end of the lower waveguide 52 into the upper waveguide 56 at a first end thereof. The light is internally reflected (e.g., total internal reflection (TIR)) through the upper waveguide towards a second end thereof during a first "pass." At the second end of the upper waveguide 56, the light is reflected (i.e., by a reflector or optical modifier) back towards the first end while a particular property of the light (e.g., angle of propagation, frequency, polarization, etc.) is modified. During this second pass, because of the modified property, the light enters the extraction layer 54, and is redirected through the opposing side of the upper waveguide 56 into the LCD assembly 46.

Angular uniformity in the light propagating through the LCD assembly 46 is improved, at least in part, by the by the design of the reflector, as described below, at the second end of the upper waveguide 56. Spatial uniformity in the light propagating through the LCD assembly 46 is improved, at least in part, by an adhesive layer within the extraction layer 54 that meters the amount of light that enters the extraction layer 54 and is directed through the opposing side of the upper waveguide. The design of the upper waveguide 56, as well as the extraction layer 54, also allows the upper waveguide 56 to have substantially parallel top and bottom sides, as well as reduces the overall thickness of the system 40.

Still referring to FIG. 1, the support substrate, or heat sink, 42 is made of, for example, a thermally conductive material such as aluminum or copper, and although only shown from the side, is substantially rectangular (or square) with, for example, a width (or side length) 48 of between 30 and 40 centimeters (cm) and a thickness 50 of between 2 and 4 millimeters (mm).

Figure 2:
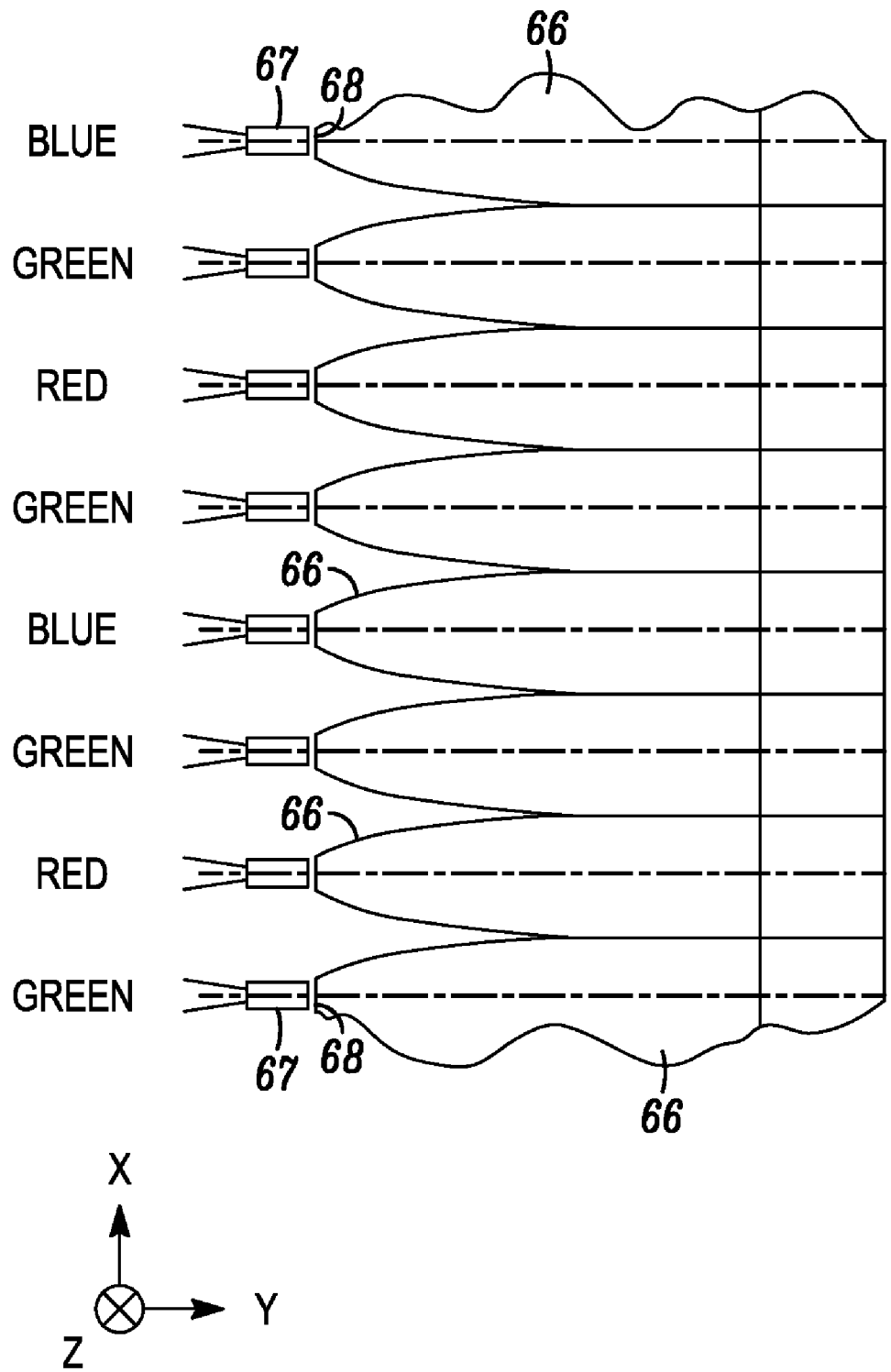
FIG. 2 is a top plan view of the lower waveguide of FIG. 1.

The LED array 60 is positioned near a side of the support substrate 42 and directed towards the opposing side of the substrate 42. Each LED 67 is housed in an LED heat sink 64 and installed on a metal heat conduction block 65, which provides a heat conduction path to the support substrate 42. In one embodiment, the LED array 60 includes multiple, individual LEDs 67 that generate light of different frequencies. The different frequencies may correspond to different colors, such as green, red, and blue, as shown in FIG. 2. Although not shown in detail, in one embodiment, the front emitting surfaces of the LEDs 67 are lens-less, window-less, and substantially square with a side length of, for example, 1 mm. The LEDs 67 may also have a substantially lambertian directional output characteristic.

Still referring to FIGS. 1 and 2, the lower waveguide 52 is positioned on a side of the support substrate 42 adjacent to the LED array 60 and includes an array of collimators 66, or collimator assembly. As indicated in FIG. 2, an input port 68 of each collimator 66 is aligned with the emitting surface of one of the LEDs 67 indicated by the colors "green," "red," and "blue." FIGS. 3-6 illustrate one of the collimators 66 in greater detail. In one embodiment, the collimator input ports 68 are slightly larger than the LED emitting surfaces to allow for alignment tolerances. For example, input ports 68 may be substantially square with a side length of approximately 1.1 mm. The LED emitting surfaces may be in direct contact with the collimator input ports 68. Although not specifically shown, the lower waveguide 52 and/or the collimators 66 may have, for example, a thickness of between 4 and 9 mm (as measured over the substrate 42 in FIG. 1). In one embodiment, the lower waveguide 52 and/or the collimators 66 have a thickness of approximately 8.43 mm.

In one embodiment, the collimators 66 (shown upside down in FIGS. 3-5) are molded monolithic components with an input section 70 and an output section 72 and are made of Topas, which has a refractive index (n) of 1.53. The input section 70 of each collimator 66 has a tapered, rectangular cross-section that narrows towards the input port 68 and away from an output port 69 thereof. The input section 70 may include a dielectric-filled Compound Parabolic Concentrator (CPC), as will be appreciated by one skilled in the art, which is bounded by two identical two-dimensional (2-D) CPCs axially rotated by 90 degrees (°) relative to each other. The output section 72 is a dielectric-filled tube having a substantially square, constant cross-section of invariant size with a tilted, planar output surface (or TIR surface), or tilted reflector, 74, lateral sides 76 and 78, a top side 80, and a bottom side 82. In the depicted embodiment, the output surface 74 is rectangular and normal to the lateral sides 76 and 78 of the output section 72. As shown specifically in FIGS. 5 and 6, an angle, $\phi$, lies between of the output surface 74 and a line perpendicular to the top and bottom sides 80 and 82 of the output section 72. As will be described in greater detail below, the angle $\phi$ may be selected to, for example, totally internally reflect (TIR) substantially all light passing through the collimators 66 such that the light exits output section 72 by being reflected via TIR from the output surface 74. In one embodiment, the angle $\phi$ is approximately 45.71°. In another embodiment, the input sections 70 (and/or the CPCs) have tapered, circular cross-sections, as well as circular input ports 68.

Figure 6:
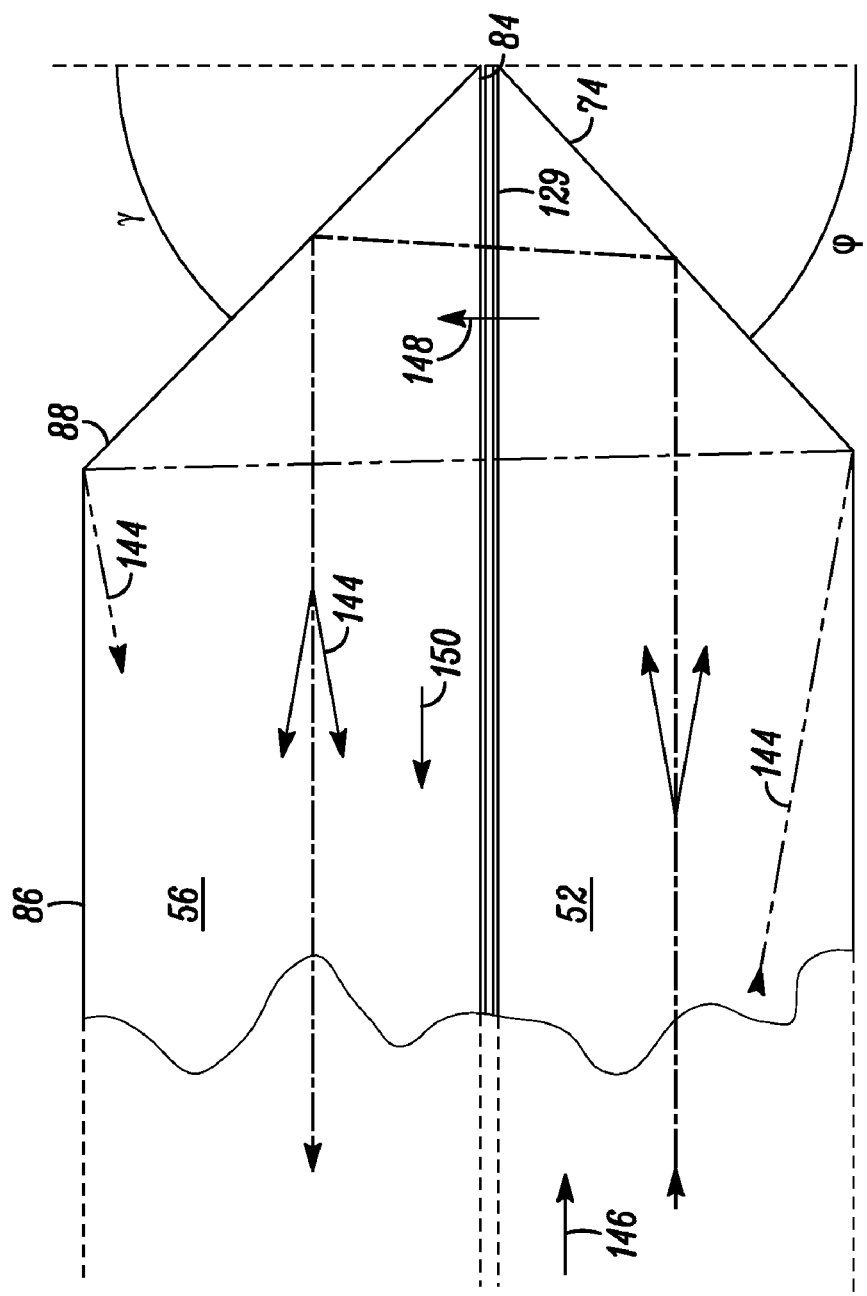
FIG. 6 is a side view of end sections of the lower and upper waveguides of FIG. 1.

Referring again to FIG. 1, in one embodiment, the upper waveguide 56 is made of a substantially transparent, acrylic material with a refractive index of approximately 1.49. The upper waveguide is substantially rectangular with a uniform thickness of, for example, between 6 and 12 mm as measured between a lower (or bottom) side 84 and an upper (or top) side 86 thereof. That is, the top and bottom sides 86 and 84 of the upper waveguide are substantially parallel in the depicted embodiment. In one embodiment, the upper waveguide has a thickness of approximately 10.30 mm. As shown in FIGS. 1 and 6, a first end 88 of the upper waveguide 56 is tilted and planar in a fashion similar to the output surface 74 (FIG. 4) of the collimators 66 of the lower waveguide 52. As shown specifically in FIG. 6, an angle, $\gamma$, lies between of the first end 88 of the upper waveguide 56 and a line perpendicular to the top and bottom sides 86 and 84 of the upper waveguide 56. In one embodiment, the angle $\gamma$ is approximately 43.55°. As shown in FIG. 1, a second end 90 of the upper waveguide 56, opposite the first end 88 of the upper waveguide 56, is substantially perpendicular to the top and bottom sides 86 and 84.

FIGS. 7 and 8 illustrate the positional relationship between a first side (or edge) 92 and a second side 94 of the upper waveguide 56 and the collimators 66 in the lower waveguide 52. As is apparent from FIGS. 1 in combination with FIG. 8, the upper waveguide 56 is shown from the x-direction, which is normal to the second side 94 in FIG. 8.

As indicated in FIG. 7 in combination with FIG. 8, the lower waveguide 52 and/or the collimators 66 span the width (in the x-direction) of upper waveguide 56. As shown, centerlines 96 and 97 of particular collimators 66 are aligned with the first and second edges 92 and 94 of the upper waveguide 56. In particular, the centerline 96 of a "blue" collimator 66 (i.e., a collimator 66 aligned with a blue LED) is aligned with the first edge 92 of the upper waveguide 56, and the centerline 97 of a "red" collimator 66 is aligned with the second edge 94 of the upper waveguide 56. Accordingly, approximately half of each these particular collimators 66 overlaps the corresponding edge of the upper waveguide 56. This overlap ensures that beams projected by the array of collimators 66 are reflected by the first and second edges 92 and 94 of the upper waveguide 56 thereby generating a virtual continuation of the real collimator array, as will be appreciated by one skilled in the art. In FIGS. 7 and 8, "real" collimators 66 (and real portions of the collimators 66) are drawn with solid lines, while "virtual" collimators 66 (and virtual portions of the collimators 66) are drawn with dashed lines.

Referring again to FIG. 1, the upper waveguide 56 also includes a first reflector 98 mounted to the first end 88 and a second reflector 100 mounted to (or deposited onto) the second end 90. Although not shown in detail, the first reflector may include a mirror-coated, or reflective, surface adjacent to, and tilted similarly as, the first end 88 of the upper waveguide 56. In one embodiment, the first reflector 98 is a reflective film laminated onto the first end 88 of the upper waveguide 56. In other embodiments the first reflector 98 may be a mirror coating applied directly to the first end 88 of the upper waveguide 56. It should also be understood that if the collimation of incident light is sufficient, the first reflector 98 may take the form of the first end 88 of the upper waveguide 56 itself, as the reflection could result from TIR.

Figure 11:
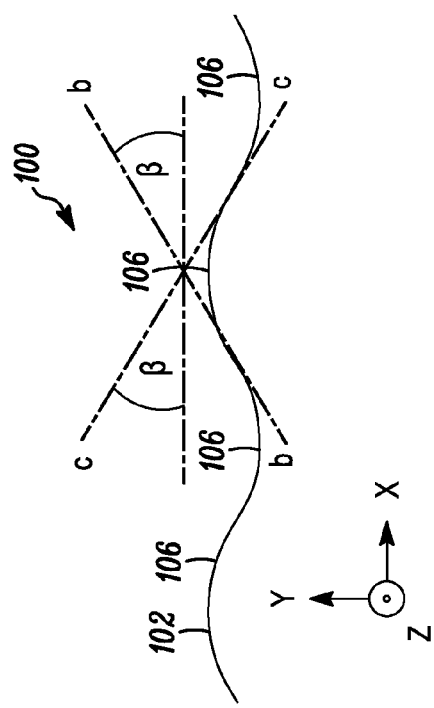
FIG. 11 is a cross-sectional view of the reflector of FIG. 10 taken along line 11-11.
Figure 10:
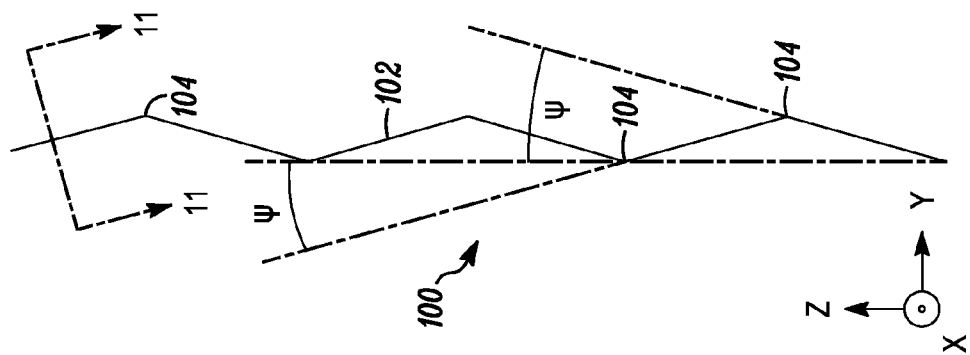
FIG. 10 is a side view of the reflector of FIG. 9.
Figure 9:
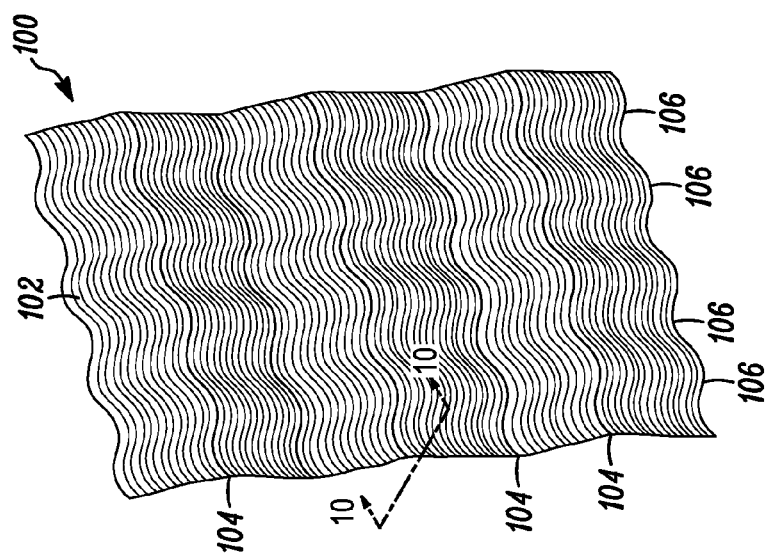
FIG. 9 is an isometric view of a reflector on an end of the upper waveguide.

Referring to FIGS. 9-11 in combination with FIG. 1, the second reflector (or optical modifier) 100 includes a reflective surface 102 that faces the first end 88 of the upper waveguide 56. As shown, the reflective surface 102 is micro-structured, or "rippled," with first and second sets 104 and 106 of alternating raised and recessed formations (i.e., peaks and troughs) that extend in substantially perpendicular directions. That is, the first set of formations 104 substantially extends in the x-direction, while the second set of formations 106 substantially extends in the z-direction. As shown in FIG. 10, the first set of formations 104 are a "zig-zag" arrangement of substantially straight edges tilted at angles of $+\psi°$ and $-\psi°$ relative to the z-axis direction and/or relative to a line perpendicular to the top and bottom sides 86 and 84 of the upper waveguide 56 (FIG. 1). Referring to FIG. 11, the second set of formations 106 are formed from curved portions, which have maximum slope angle magnitudes between 0° and $\beta°$ (i.e. the slope of the curved portions vary between $+\beta°$ or $-\beta°$) relative to the x-axis direction.

Figure 12:
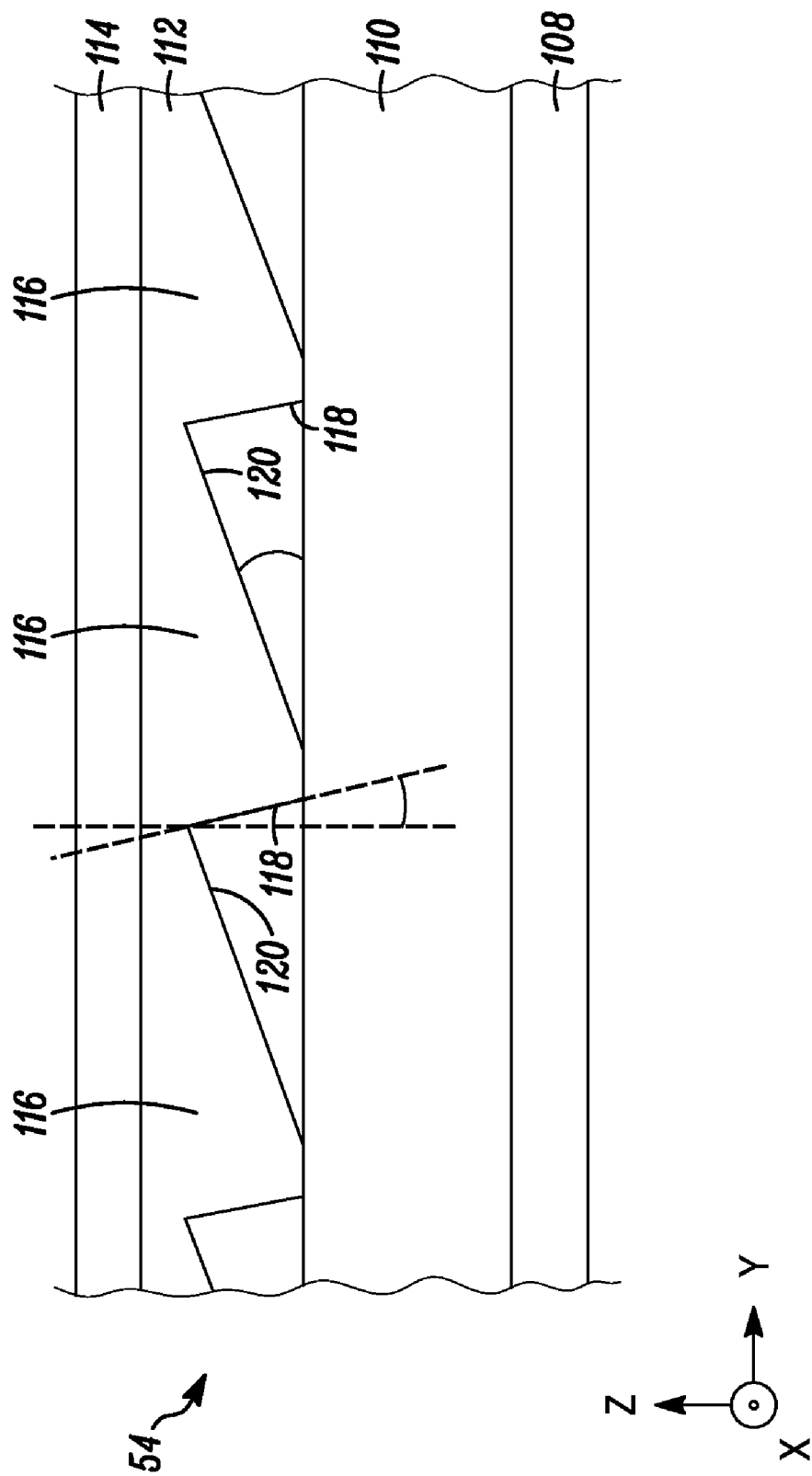
FIG. 12 is a cross-sectional side view of an extraction layer detail between the lower waveguide and the upper waveguide of FIG. 1.

Referring yet again to FIG. 1, the extraction layer (or extraction material) 54 is positioned between, and adjacent to, the top sides 80 of the collimators 66 (in FIG. 5) of the lower waveguide 52 (in FIG. 1) and the bottom side 84 of the upper waveguide 56 (in FIG. 1). FIG. 12 illustrates the extraction layer 54 in greater detail. The extraction layer 54, in the depicted embodiment, includes a lower adhesive layer 108, a light absorbing layer 110, an extraction film 112, and an upper adhesive layer 114. The lower adhesive layer 108 may be a pressure sensitive adhesive (PSA) film attached to the top sides 80 of the collimators 66 (FIGS. 3-5) and may have a thickness of approximately 100 micrometers (μm).

In one embodiment, the light absorbing layer 110 is laminated to the lower adhesive layer 108. As shown in FIG. 1, the light absorbing layer 110 does not extend into the reflection assembly 58. As such, the portion of the lower adhesive layer 108 within reflection assembly 58 shown in FIG. 1 is not covered by the light absorbing layer 110.

Referring to FIG. 12, the extraction film 112 is placed over the light absorbing layer 110 and a substantially planar upper surface and a lower surface that includes a structured portion, with a plurality of extraction features (or facets) 116 formed thereon adjacent to the light absorbing layer 110. The lower surface of the extraction film 112 also includes an unstructured portion adjacent to the portion of the lower adhesive layer 108 within the reflection assembly 58 (shown in FIG. 1) that is not covered by the light absorbing layer 110. Each extraction feature 116 includes a first tilted facet 118 and a second tilted facet 120, which although not shown, extend substantially the entire width (i.e., in the x-direction) of the extraction film 112. Although not specifically labeled, in one embodiment, the first tilted facet 118 is at an angle of approximately 3° (or greater) to the z-x plane, and the second tilted facet 120 is an at angle of approximately 16.8° to an upper surface of the light absorbing layer 110 and/or the x-y plane. As will be appreciated by one skilled in the art, the 3° (or greater) incline of the first tilted facet 118 facilitates a mold release process. In one embodiment, the extraction film 112 is substantially transparent (made of, for example, Topas) and has a refractive index of, for example, approximately 1.47 and a thickness of approximately 100 μm.

Figure 13:
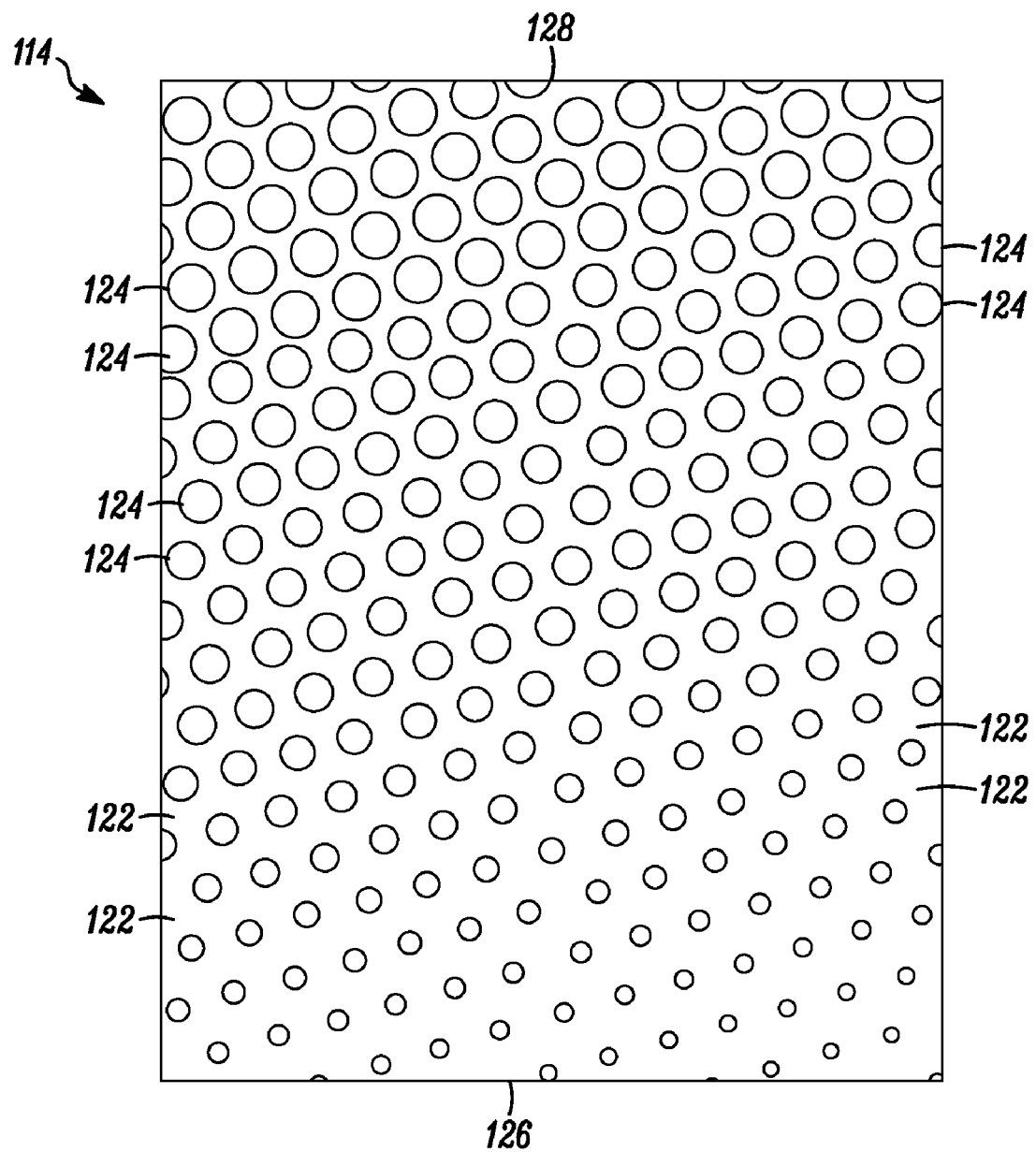
FIG. 13 is a top plan view of an adhesive layer detail of an interface portion of the extraction layer of FIG. 12.

The upper adhesive layer 114 is attached to the upper surface of the extraction film 112 and extends the entire width of the upper waveguide 56. The upper adhesive layer 114 may be a PSA similar to the lower adhesive layer 108 that may be applied to the bottom side 84 of the upper waveguide 56 using, for example, a silk screening process. However, as shown in FIG. 13, which illustrates a portion of the upper adhesive layer 114 according to one embodiment, the upper adhesive layer 114 is applied in a "halftone" pattern such that the layer 114 includes adhesive material portions, or areas, 122 and air gap portions, or areas, (or "air dots") 124. The adhesive material areas 122 are largest near a first end 126 of the portion of the upper adhesive layer 114 and become progressively smaller near a second end 128 of the portion. In contrast, the air gap areas 124 are largest near the second end 128 of the upper adhesive layer 114 and become progressively smaller near the first end 126. As such, the ratio of the total surface area occupied by the air gap portions 124 to the total area occupied by the adhesive material portions 122 increases as the upper adhesive layer 114 extends from a first end 126 to a second 128 thereof. Likewise, the ratio of the total surface area occupied by the adhesive material portions 122 to the total surface area of the air gap portions 124 increases as the upper adhesive layer 114 extends from the second end 128 to the first end 126 (i.e., this ratio increases as a function of distance from the second end 128 of the adhesive layer 114 and/or the second reflector 100).

Although not specifically illustrated, in one embodiment, the upper adhesive layer 114 is arranged such that the first end 126 thereof is adjacent (or at least nearer) to the first end 88 of the upper waveguide 56 and the second end 128 thereof is adjacent (or at least nearer) to the second end 90 of the upper waveguide 56. As will be described in greater detail below, the pattern and orientation of the upper adhesive layer 114 regulate the spatial uniformity of the light propagating through the upper waveguide 56. It should be understood that the pattern of the air dots 124 may be sufficiently randomized so as to avoid moire effects with LCD pixels.

Although not specifically shown, it should be understood that in one embodiment, the halftone dots are adhesive dots surrounded by air near the second end 90 of the upper waveguide 56, and that the halftone dots transition to air dots surrounded by adhesive somewhere near the center of upper waveguide 56. Such an arrangement may facilitate a uniform light extraction rate, as a majority of the light incident on the upper adhesive layer 114 ideally TIRs near the second end 90 when the incident flux density is highest. Similarly, a majority of the incident light is transmitted near the first end 88 where the incident flux density is lowest. Additionally, no air gaps may exist in the region of the upper adhesive layer 114 adjacent to the unstructured portion of extraction film 112 in order to maximize the flux projected from the planar output surfaces 74 of the collimators 66 of the lower waveguide 52 to the first end 88 of the upper waveguide 56.

Referring again to FIGS. 1 and 12, as indicated by the dashed line in FIG. 1, the reflection assembly 58 may be understood to include the output ends of the collimators 66 of the lower waveguide 52 including the total internally reflecting surfaces 74 (FIGS. 4-6), or first optical component, the first end 88 of the upper waveguide 56 including the first reflector 98, or second optical component, and the portion of the extraction layer 54 that is not occupied by the light absorbing layer 110 and the extraction features 116. The interface between this particular portion of the extraction layer 54 and the collimators 66 may be considered to form output apertures 129 of the collimators 66.

Referring again to FIG. 1, the controller subsystem 62 (or processing subsystem), in one embodiment, is mounted to the support substrate 42 on a side of the LED array 60 (i.e., behind) opposite the lower waveguide 52 and, as will be appreciated by one skilled in the art, may include electronic components, including various circuitry and/or integrated circuits (e.g., a microprocessor and a power supply), such as an Application Specific Integrated Circuit (ASIC) and/or instructions stored on a computer readable medium to be carried out by the microprocessor to perform the methods and processes described below. The controller subsystem is in operable communication and/or electrically connected to the LED array 60, and although not shown, may also be in operable communication with the LCD assembly 46.

Figure 14:
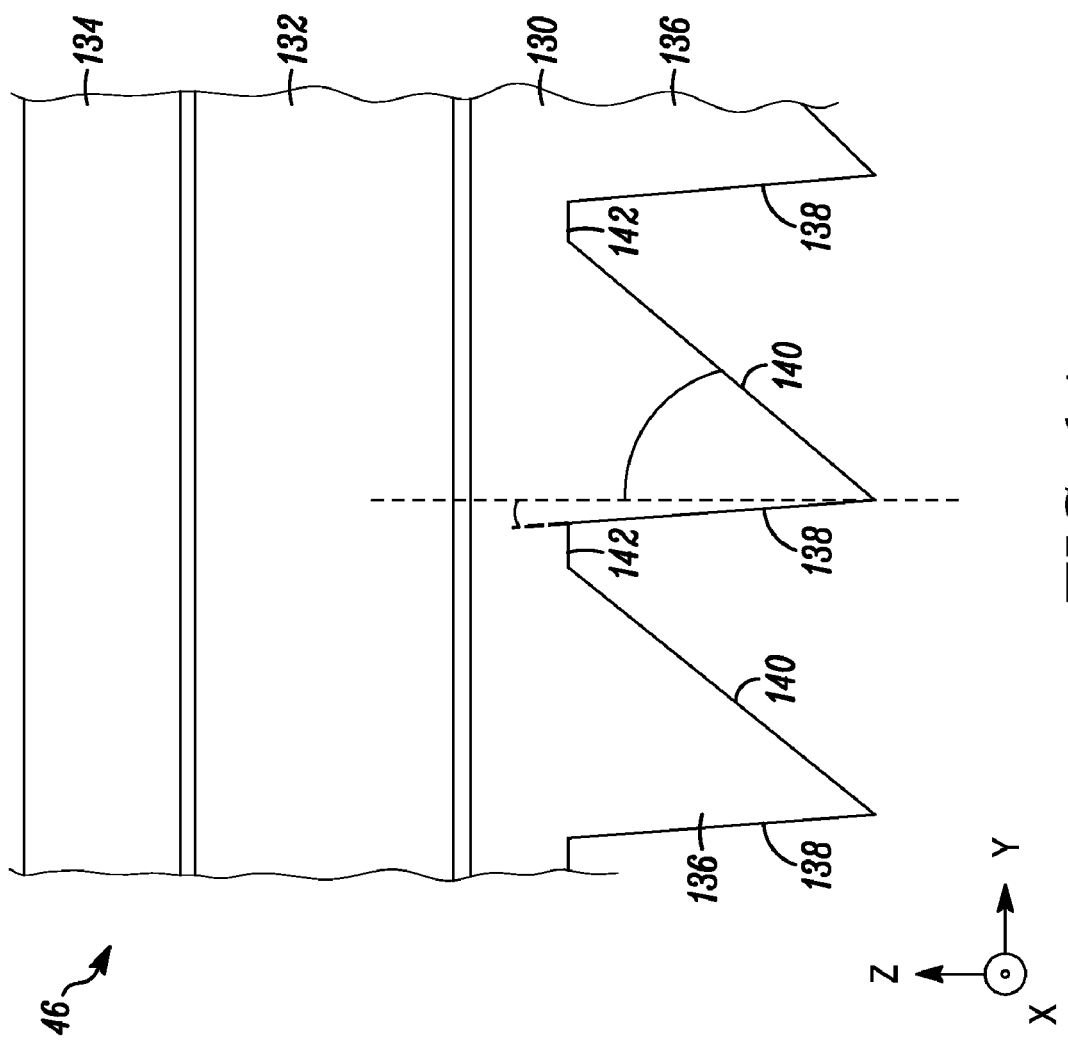
FIG. 14 is a cross-sectional side view detail of an liquid crystal display (LCD) assembly above the upper waveguide of FIG. 1.

Referring to FIG. 14 in combination with FIG. 1, the LCD assembly 46 includes a prismatic film 130, an LCD panel 132, and a viewing screen 134. The prismatic film 130 is placed over the upper waveguide 56 as shown in FIG. 1 and, in one embodiment, is approximately 0.062 millimeters thick and made of polycarbonate, which has a refractive index of 1.586. The prismatic film 130 has a substantially planar upper surface and a lower surface with a plurality of prismatic features 136 formed thereon from first and second tilted facets 138 and 140 and flat facets 142. In one embodiment, the first tilted facet 138 is inclined by 3° with respect to the z-x plane, and the second tilted facet 140 is inclined by 34.6101° with respect to the z-x plane. As is the case with the first tilted facet 118 in FIG. 12, the tilt of 3° (or greater) of the first tilted facet 138 shown in FIG. 14 may be selected to facilitate the mold release process. The flat facets 142, which are substantially parallel to the x-y plane, may be provided to reduce the sharpness of the inside corners of the prismatic film 130, which may further enhance the mold release process. Although the prismatic film 130 is described herein as being a component of the LCD assembly 46, it should be understood that the prismatic film 130 may also be considered to be a component of the backlight 44 shown in FIG. 1.

The LCD panel 132 is adjacent to the upper surface of the prismatic film 130 and, in one embodiment, is an active matrix (AM) thin film transistor (TFT) LCD panel. Although not illustrated, the LCD panel 132 may include two glass substrates, a liquid crystal layer, and polarizers. As will be appreciated by one skilled in the art, the lower substrate may be made of glass and have a plurality of TFT transistors formed thereon, including a plurality of gate and source electrodes that divide the lower substrate into a plurality of pixels, as is commonly understood. The viewing screen 134 is positioned over the LCD panel 132 and is substantially transparent.

During operation, referring to FIGS. 1, 2 and 6, light is, or light rays 144 from the each LED in the LED array 60 are, projected into the respective collimator 66 of the lower waveguide 52 with which it is aligned. As mentioned before, in one embodiment, each LED emits light of a particular color (e.g., red, blue, or green). The collimators 66 collimate the light 144 from the LEDS while projecting it towards the planar output surfaces 74 of the collimators 66 (i.e., generally in direction 146). It should be noted that the refractive index of the lower adhesive layer 108 (shown in FIG. 12) may be sufficiently low so that light is not extracted from the lower waveguide 52 into the light absorbing layer 110.

Referring to FIG. 6, the angle $\phi$ is selected such that the output surface 74 of the lower waveguide 52 (or the collimators 66) totally internally reflects, or "bounces," (e.g., by TIR) substantially all light passing through the collimators 66 such that the light propagates from the output section 72 by being reflected from the output surface 74 (FIG. 4), through the output apertures 129 (i.e., generally in direction 148). The light is then reflected by the first reflector 98 towards the second end 90 of the upper waveguide 56 shown in FIG. 1 (i.e., generally in direction 150). As will be appreciated by one skilled in the art, the optical path length provided by the upper waveguide 56 may be made sufficiently long such that, during a first pass through the upper waveguide 56, color mixing is completed.

Figure 15:
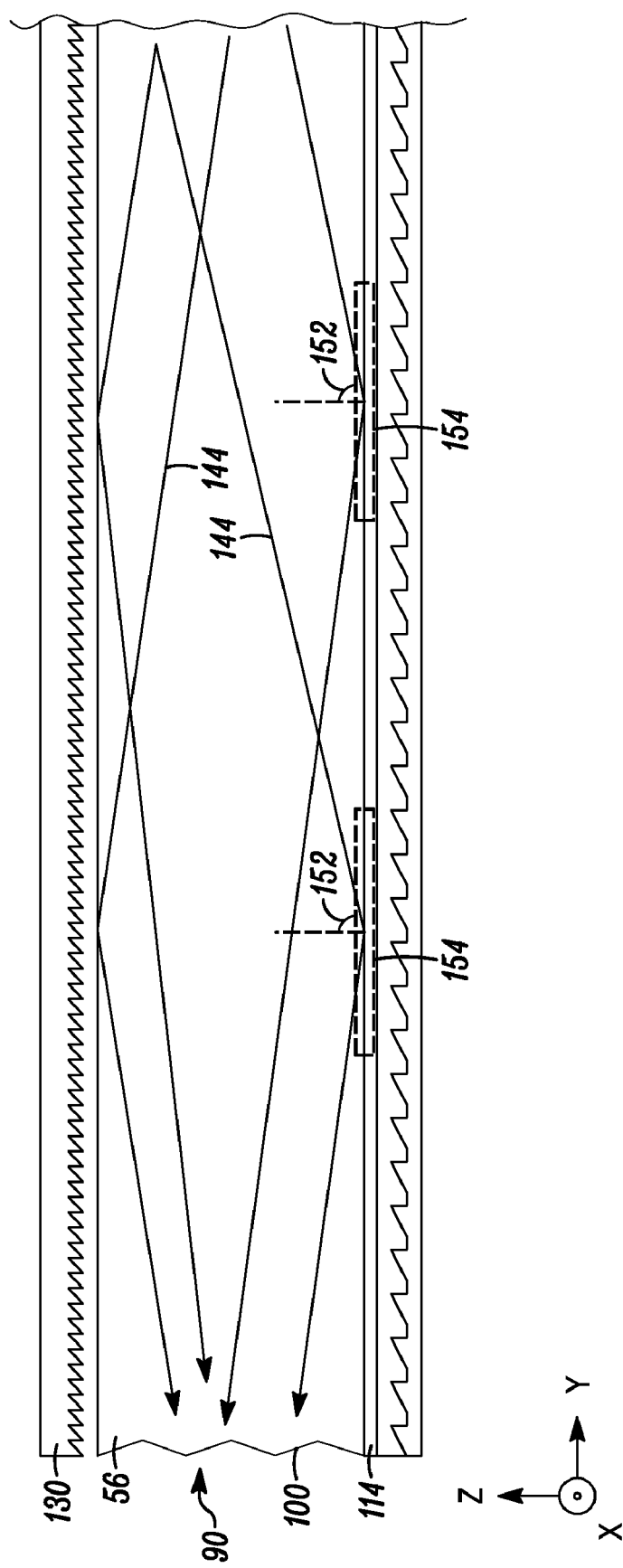
FIG. 15 is a side view detail of the upper waveguide of FIG. 1 illustrating the propagation of light therethrough during a first pass.

Additionally, the angles $\phi$ and $\gamma$ are selected, in combination with the refractive indices of the upper waveguide 56 and the lower waveguide 52 such that, after reflection from the first reflector 98 (FIG. 1), substantially all of the light 144 that propagates towards the second end 90 of the upper waveguide 56 is totally internally reflected, at the interface between the upper waveguide 56 and the upper adhesive layer 114 (as shown in FIG. 15), at the upper waveguide 56 top surface interface with air, and at the edge interfaces of upper waveguide 56 with air. In particular, an angle of incidence 152 with the interface between the upper waveguide 56 and the upper adhesive layer 114, as measured from a line normal to the interface (as shown in FIG. 15), may be sufficiently high such that total internal reflection occurs off at least selected portions 154 of the interface. The minimum allowable angle of incidence 152 (for total internal reflection to occur) may be understood to be a first "property" of the light 144 propagating through the upper waveguide. As will be made evident below, the selected portions 154 may be chosen for solely illustrative purposes. It should also be understood that some of the light 144 may also propagate directly to the second end 90 of the upper waveguide 56 without being totally internally reflected from the top or bottom sides or the edges of upper waveguide 56.

Figure 16:
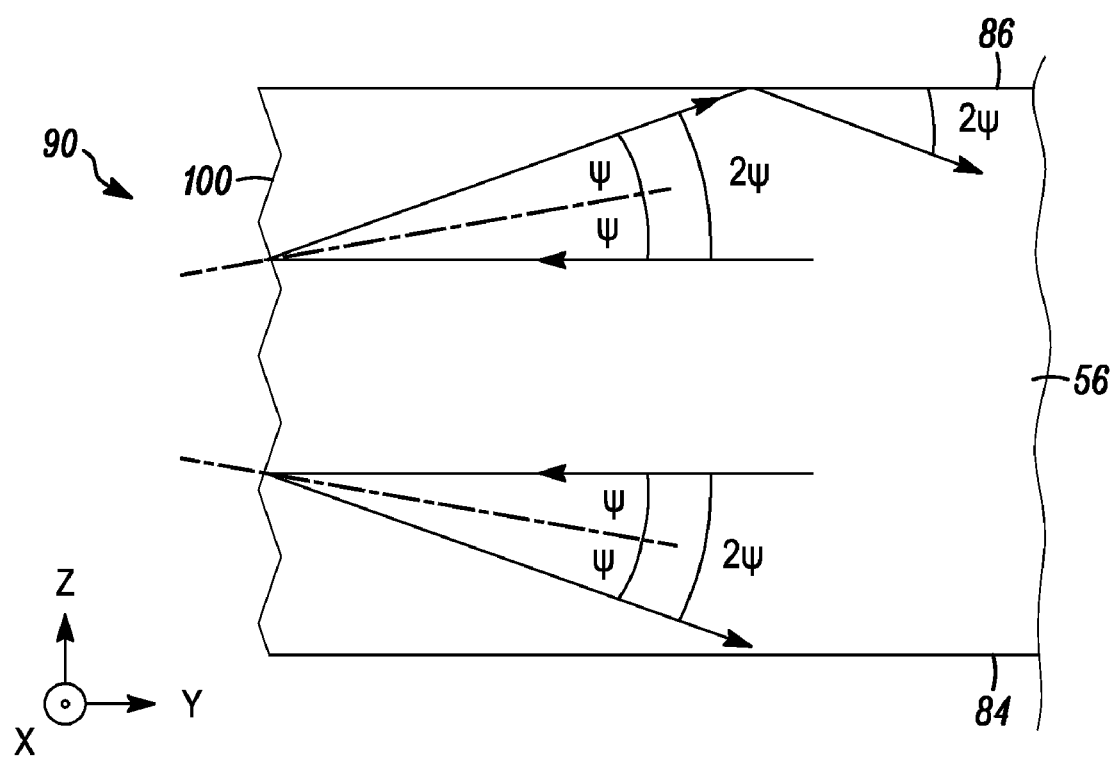
FIG. 16 is a side view of the reflector on the end of the upper waveguide illustrating the reflection of light therefrom.

As shown in FIG. 16, at the second end 90 of the upper waveguide 56, the light 144 is reflected by the second reflector 100 back towards the first end 88 of the upper waveguide 56 (i.e., generally in the direction 146 shown in FIG. 6). During the first pass through the upper waveguide 56, the light propagates in the negative y-direction as single directional lobes each comprising a range of propagation directions centered on a common central axis, which is parallel to the y-axis. After reflecting from the second reflector 100 and the microstructure thereon shown in FIGS. 9-11, the single directional lobes become split into two distinct lobes in the z-y plane having propagation directions at angles of $+2\psi$ and $-2\psi$ from the normal to the x-y plane. That is, one lobe may be substantially propagating towards the top side 86 of the upper waveguide 56, and the other lobe may be substantially propagating towards the bottom side 84 of the upper waveguide 56.

Figure 17:
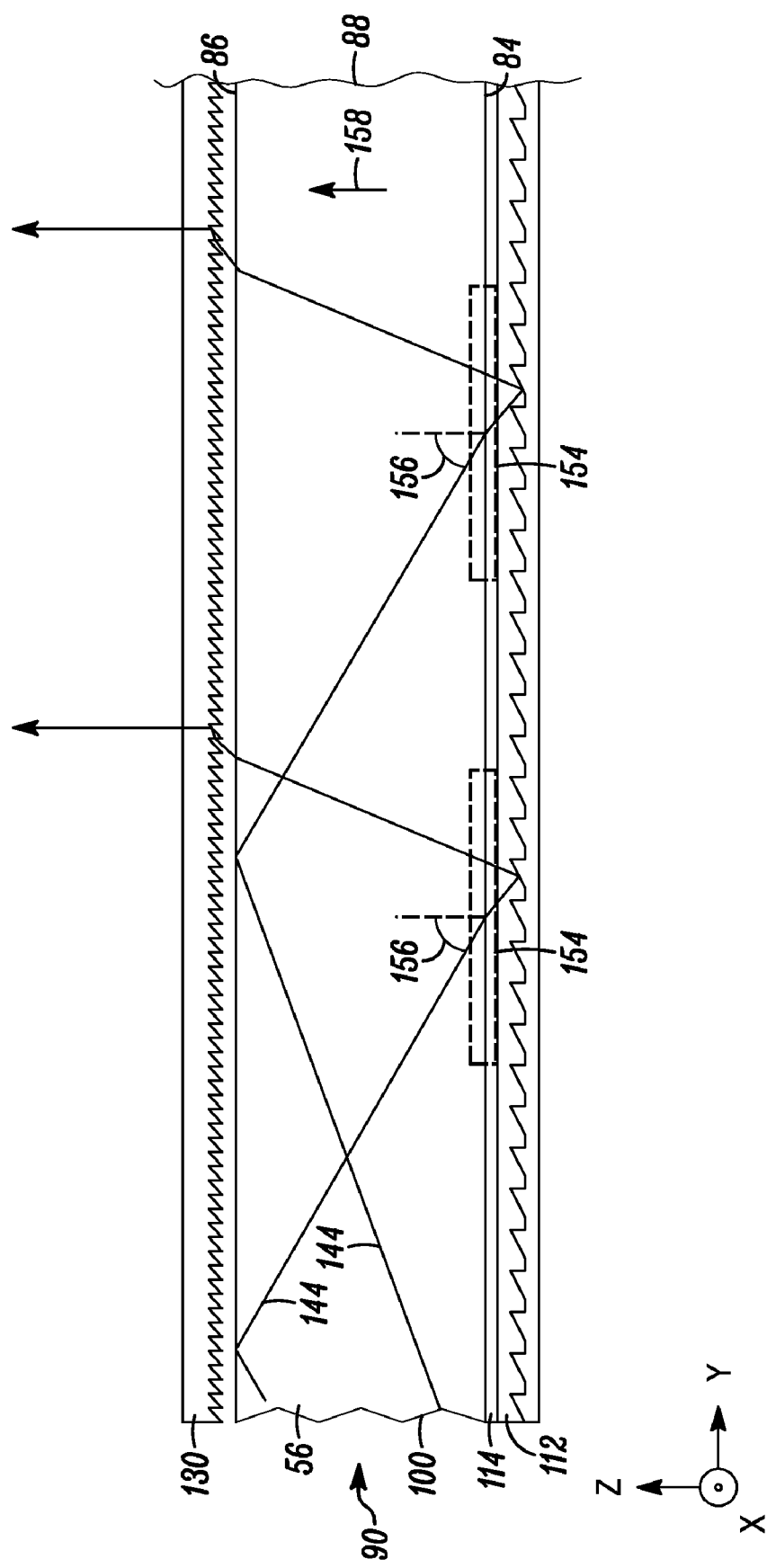
FIG. 17 is a side view of the upper waveguide of FIG. 1 illustrating the extraction and the propagation of light therethrough during a second pass.

Referring now to FIG. 17, the light 144 in the lobe propagating towards the top side 86 of the upper waveguide 56 is totally internally reflected towards the bottom side 84, which is the upper adhesive layer 114 interface with upper waveguide 56. After the reflection by the second reflector 100, the light 144 (i.e., both lobes) may have an angle of incidence 156 (i.e., a second property) that is less than the minimum angle of incidence 152 observed during the first pass of the light 144 through the upper waveguide 56. Thus, the second reflector 100 modifies the light 144 such that the first property was changed to the second property. In particular, the first set of formations 104 on the second reflector 100, shown in FIG. 9, splits the single lobes incident on it (and possessing the first property) into two distinct reflected lobes (possessing the second property). By virtue of this second property, the distinct lobes reflected by the second reflector 100 have a smaller angle of incidence on the interface between the upper waveguide 56 and the upper adhesive layer 114 than that of the single lobe incident on the second reflector 100, which possesses the first property.

The reduction in the angle of incidence with the interface between the upper waveguide 56 and the upper adhesive layer 114 allows the light 144 to pass through the interface, including at the selected portions 154 thereof, and through the upper adhesive layer 114. When the light 144 propagates through the upper adhesive layer 114, it is totally internally reflected from the tilted facets 120 of the extraction film 112 (FIG. 12), and then propagates (with a third property) back through the adhesive layer 114 towards the top side 86 of the upper waveguide (i.e., generally in direction 158). Still referring to FIG. 17, after the light possessing a third property passes through the top side 86 of the upper waveguide 56, the light 144 is redirected, by refraction and reflection through the prismatic film 130, to propagate substantially in the z-direction, and through the LCD panel 132 and viewing screen 134, shown in FIG. 14.

Referring to FIGS. 13 and 17 in combination, the distribution of the light 144 directed through the top side of the upper waveguide 56 is metered by the halftone pattern of the upper adhesive layer 114. In particular, as the light 144 propagates towards the first end 88 of the upper waveguide 56 and the first end 126 of the upper adhesive layer 114, the likelihood that the light 144 will strike the interface at an adhesive material portion 122 increases. Because the adhesive material portions 122 have a higher refractive index than the air within the air gap portions 124 any of the light 144 that strikes the adhesive material portions will (with the implementation of proper system design parameters) do so at an angle of incidence 156 that is sufficiently small to cause the light 144 to pass through the upper adhesive layer 114 and then be redirected by the extraction film 112 towards the top side 86 of the upper waveguide 56. Accordingly, in order to achieve spatial uniformity, a gradually increasing fraction of the diminishing light 144 is extracted as the light 144 nears the first reflector 98 during the second pass.

The light 144 is extracted from the upper waveguide 56 at relatively large angles from a normal to the top side 86 of the upper waveguide 56. Upon passing through and exiting the prismatic film 130, in one embodiment, the system design parameters are engineered such that the light 144 enters the LCD panel 132 at small angles from the normal to the top side 86 of the upper waveguide 56 and with radial angular symmetry about the normal.

As is commonly understood in the art, an LCD panel 132 creates an image by modulating the light 144 propagating therethrough. Upon exiting the LCD panel 132, the collimated light 144 from each pixel of the LCD panel 132 passes through the viewing screen 134, which diffuses the light 144 thus spreading the light 144 into a wide range of viewing angles.

Figure 18:
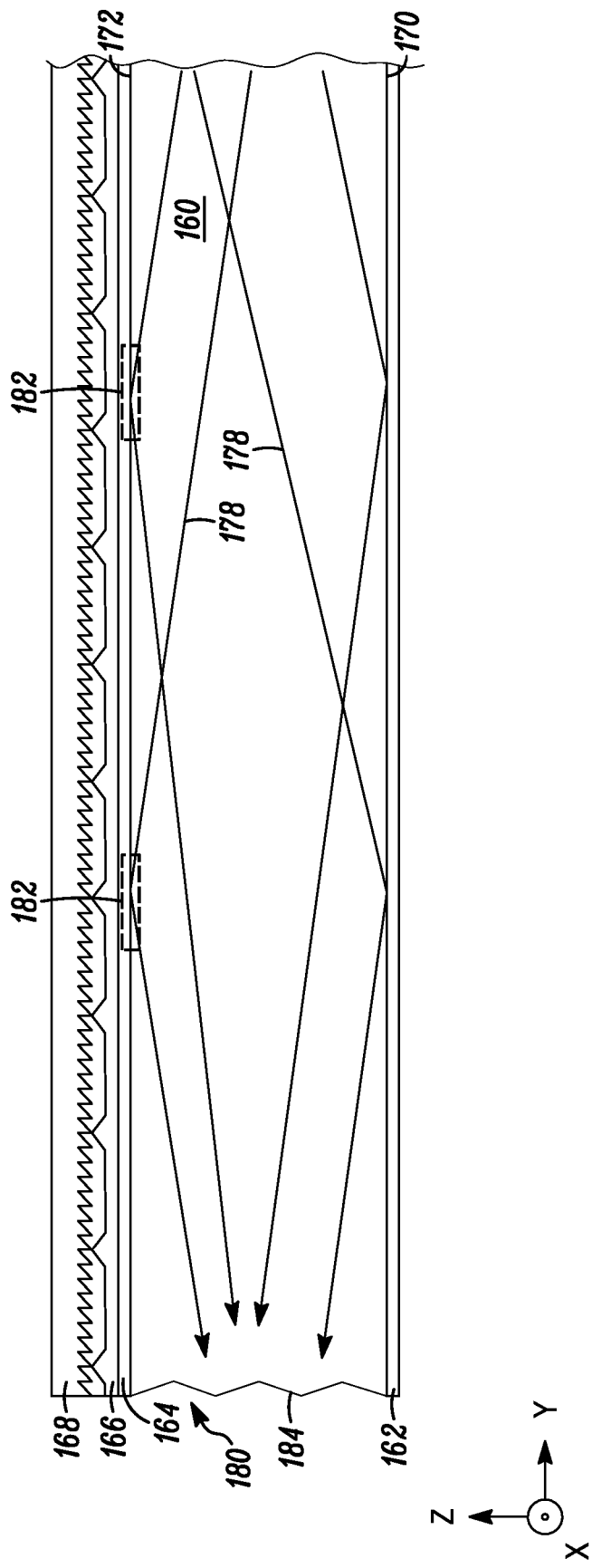
FIG. 18 is a side view of a portion of an upper waveguide and an extraction layer according to another embodiment of the present invention and illustrating the propagation of light therethrough during a first pass.
Figure 19:
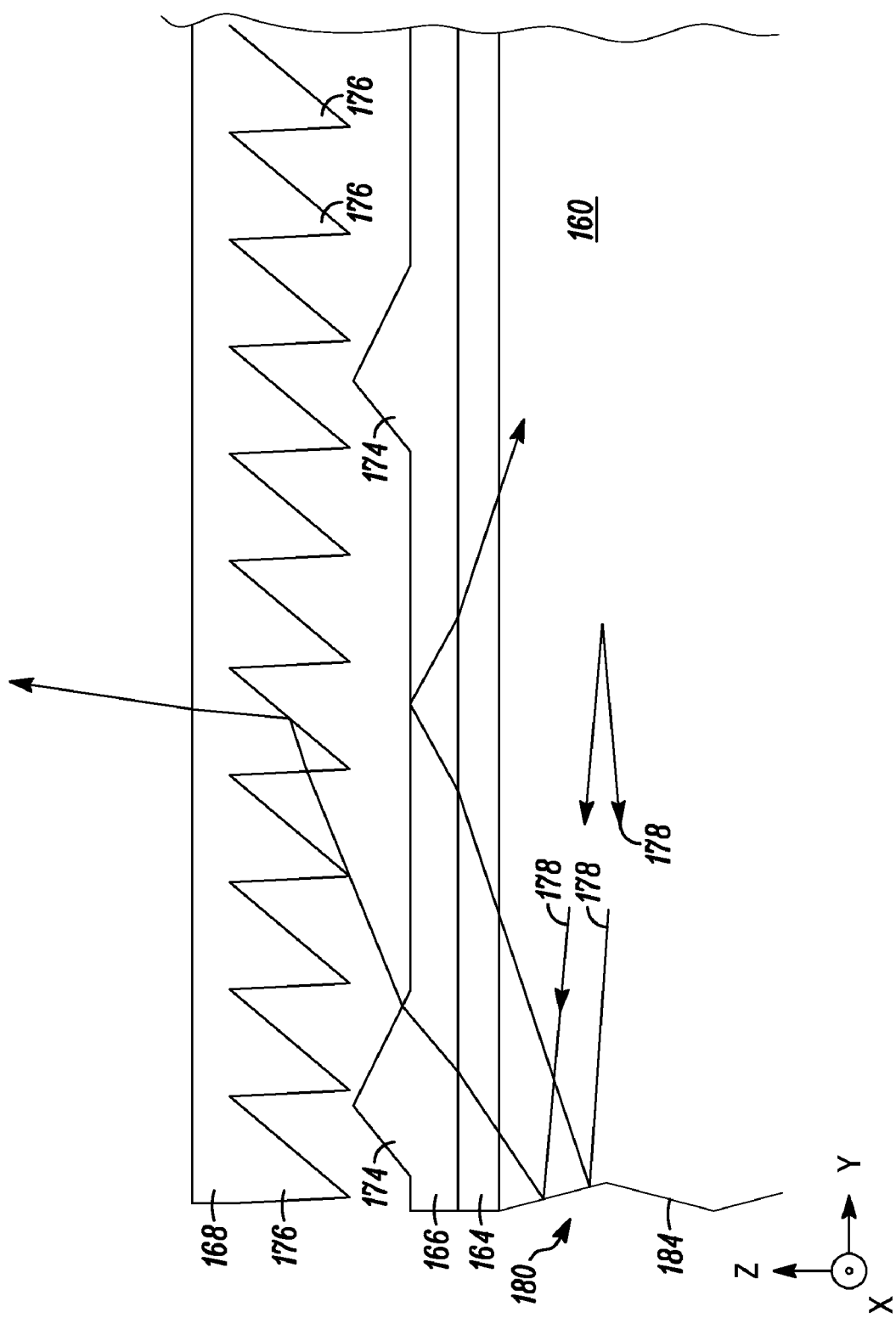
FIG. 19 is a side view of a portion the upper waveguide and extraction layer of FIG. 18 illustrating the extraction of light during a second pass.

FIGS. 18 and 19 illustrate several components of a display system, according to another embodiment of the present invention. The embodiment shown in FIGS. 18 and 19 includes an upper waveguide 160, a lower air gap layer 162, an upper adhesive layer 164, an extraction layer 166, and a prismatic film 168. Some of these components may be similar to components described previously.

However, as shown in FIGS. 18 and 19, the air gap layer 162 is adjacent to the bottom side 170 of the upper waveguide 160, and the upper adhesive layer 164 is adjacent to the top side 172 of the upper waveguide 160 and, although not shown, may include the halftone pattern as shown in FIG. 13. Additionally, the extraction layer 166 is on the top side 172 of the upper waveguide 160 with a smooth side thereof adjacent to the upper adhesive layer 164. The extraction layer 166 includes a series of extraction features 174 on a structured side thereof opposing the smooth side. As shown, the extraction features 174 of FIG. 19 have an increased distance between adjacent features 174 compared to the features 116 shown in FIG. 12. The prismatic film 168 is positioned over the extraction layer 166 with prismatic features 176 thereof adjacent to the extraction layer 166.

As shown in FIG. 18, during a first pass, light 178 propagates towards a second end 180 of the upper waveguide 160 while being totally internally reflected (e.g., TIR) at the interface (particularly selected portions 182) between the upper waveguide 160 and the upper adhesive layer 164, as well as at the interface between the upper waveguide 160 and the lower air gap layer 162. Referring to FIG. 19, a reflective body 184 (and/or an optical modifier) reflects and modifies the light (and splits the light into two lobes, as previously described) such that the angle of incidence with the interface between the upper waveguide 160 and the upper adhesive layer 164 is reduced. Accordingly, the light 178 refracts through the upper adhesive layer 164 and into extraction layer 166. As shown specifically in FIG. 19, the light 178 refracts through extraction features 174 of the extraction layer 166, crosses the air gap between extraction layer 166 and prismatic film 168, refracts into the input facets of features 176 of prismatic film 168, and is totally internally reflected by the output facets of prismatic features 176 of the prismatic film 168. Finally, the light 178 refracts out of prismatic film 168 and into air through its top surface.

Although not shown, the embodiment illustrated in FIGS. 18 and 19 may be used in conjunction with the other components shown in FIGS. 1-17, as will be commonly understood. Additional details regarding the operation and advantages, as well as additional features, of the display system 40 are discussed below.

One advantage of the system described above is that spatial light extraction uniformity is improved because of the patterning of the adhesive material in the upper adhesive layer, as in the embodiments described above, the halftone pattern meters the amount of light passing into the extraction layer. More particularly, because the adhesive has a low refractive index relative to that of the upper waveguide the light propagating through the upper waveguide on its first pass totally internally reflects (TIRs) from the upper waveguide's interface with the upper adhesive layer. However, the refractive index of the adhesive material is sufficiently high to transmit the second pass light reflected by the structured surface of the second reflector into the extraction film layer. Further, because the air gap portion spaces in the upper adhesive layer are filled with air, both the first pass light and the second pass light reflect from the upper waveguide's interface with these spaces. The discussion below further explains these advantages, as well as other advantages and additional details of embodiments of the present invention.

Figure 20:
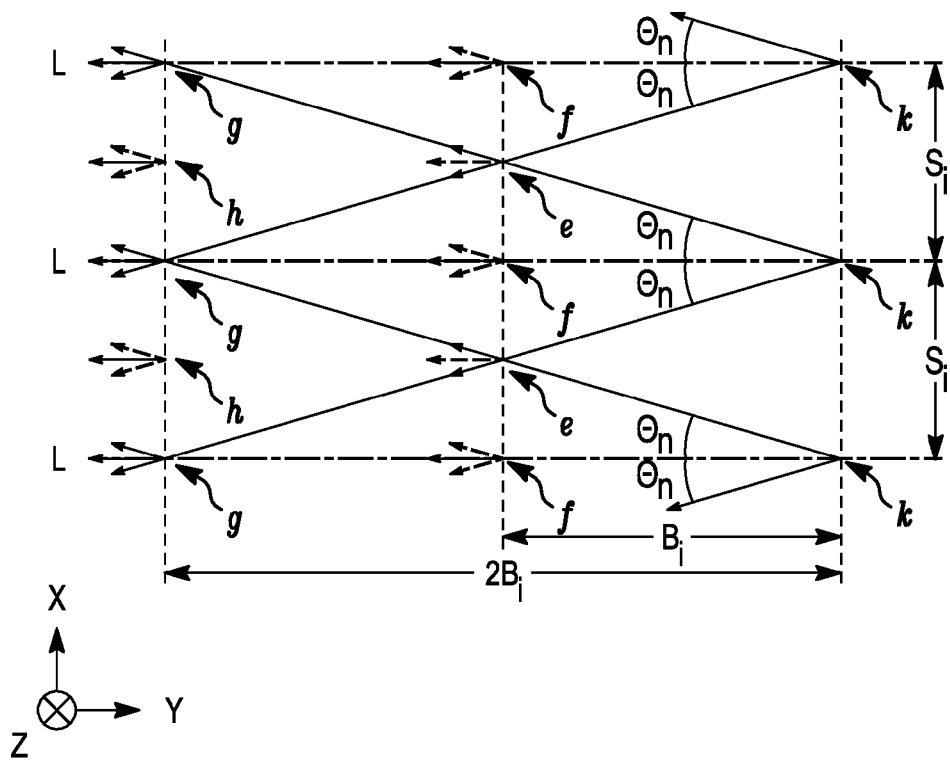
FIG. 20 is a top plan view of light propagating through the upper waveguide as multiple conic beams.

Regarding spatial uniformity, referring again to FIG. 1, after the tilted reflectors 74 of collimators 66 and the first reflector 98 of the upper waveguide 56 reflect the light projected from the LEDs 60, the axes of projected light beams from same color LEDs are spatially separated as they leave the first reflector 98 on their first pass through upper waveguide 56. As illustrated in FIG. 20, the angular span of the beams is characterized by their divergence half angle, $\theta_n$, and the separation between the centerlines of collimators that project beams of the same color is $S_i$. The propagation distance, Bi, of the beams from the output port apertures 129 of collimators 66 (FIG. 1), which eliminates spatial gaps in the plane of the beam centerlines and between diverging beams of color i, may be expressed $$B_i = S_i/(2 \tan \theta_n) \quad (1)$$

Bi is the unfolded propagation distance of the beams projected from apertures 129 in FIG. 1 in their first pass through upper waveguide 56.

Points k (i.e., "k points") in FIG. 20 represent the centers of the beams projected from the centers of the output port apertures 129 of the collimators 66. It should be noted that propagation distances $B_i$ and $2B_i$ are inclusive of the folded path between output port apertures 129 and the first reflector 98 so that these beams project in the negative y-direction through the upper waveguide 56. FIG. 20 unfolds these paths so that beam propagation distances Bi and $2B_i$ represent distances from the output port apertures 129 in FIG. 1. Accordingly, a virtual image of output port apertures 129 is created by the tilted first reflector 98 of upper waveguide 56 and the k points lie on this virtual image. Angle $\theta_n$ represents the conical divergence half angle of beams of the same color projected into the upper waveguide 56 from the array of collimators 66 of the lower waveguide 52. The n in $\theta_n$ indicates that $\theta_n$ is the angle within the acrylic refractive medium of the upper waveguide 56. It should be noted that because $\theta_n$ is a "conical" divergence half angle this discussion applies to CPC sections of the collimators that have circular cross-sections and that project beams that have a circular angular cross-section, as opposed to the 2-D CPC section shown in FIG. 4. The CPC section shown in FIG. 4 has a square cross-section and projects a beam that has an approximately square angular cross-section with a divergence of approximately $2\theta_n \times 2\theta_n$.

Points e (i.e., "e points") in FIG. 20 at a distance of $B_i$ from the k points represent points beyond which the diverging circular $\theta_n$ beams begin to overlap with their adjacent neighbors. The spatial flux density would be substantially uniform at a distance of $B_i$ from the k points if these projected beams had a square angular cross-section of $2\theta_n$ by $2\theta_n$ that was rotationally oriented about the y-axis such that the sides of the square angular cross-sections at a distance of $B_i$ from the k points were parallel to the z-axis and x-axis directions. However, because the actual beams projected from the k points are conical, they possess circular angular cross-sections. At a distance of $B_i$ from the k points, the circular cross-sections of the collimated beams are tangent with those of their adjacent neighbors. As distance from the k points exceeds $B_i$, overlap increases. At a distance of $2B_i$ from the k points, there is spatial uniformity of overlapping conical beams along a line through the g points and points h (i.e., "h points"). However, the particular conical beams that are tangent at the g points do not overlap at the h points.

Points k (i.e., "k points") in FIG. 20 are each centered (in the y-axis direction) on the output port apertures 129 of the collimators 66 in FIG. 1. The k points are displaced in the x-axis direction from their adjacent k point neighbors. A conical beam with a divergence half angle of $\theta_n$ projects from each cone apex k point in FIG. 20. It should be noted that beams having the same conical geometry also project from other points across the area of the apertures 129 other than the k points centered on the axes of the collimators 66 in FIG. 2 after reflection from the output surfaces 74 in FIG. 1. Accordingly, the resulting superposition of these beams is "smeared" in the z-axis and x-axis directions when projected on planes normal to the y-axis. The width of the smears in the z-direction and x-direction is the same as the widths of the output port apertures 129 in the z-direction and x-direction.

The cross-sectional diameters of the projected beams increase linearly with propagation distance from the k points. However, the smear widths and the separation $S_i$ between the axes of beams of the same color remain fixed as propagation distance from the k points varies.

In a preferred embodiment, the LEDs 60 (FIG. 1), as previously mentioned, are arranged in a repeating pattern of blue-green-red-green-blue-green-red-green colors. Accordingly, referring to FIG. 2 and FIG. 20, the distance between the centerlines of adjacent blue light-projecting collimators (i.e., "$S_{blue}$" when $S_i = S_{blue}$) equals the distance between the centerlines of adjacent red light-projecting collimators (i.e., "$S_{red}$" when $S_i = S_{red}$) and is twice the distance between the centerlines of adjacent green light-projecting collimators (i.e., "$S_{green}$" when $S_i = S_{green}$). The distance between adjacent centerlines (without regard to color) is equal to the width of the collimators 66 and is ¼ of $S_{blue}$, ¼ of $S_{red}$, and ½ of $S_{green}$.

Figure 21:
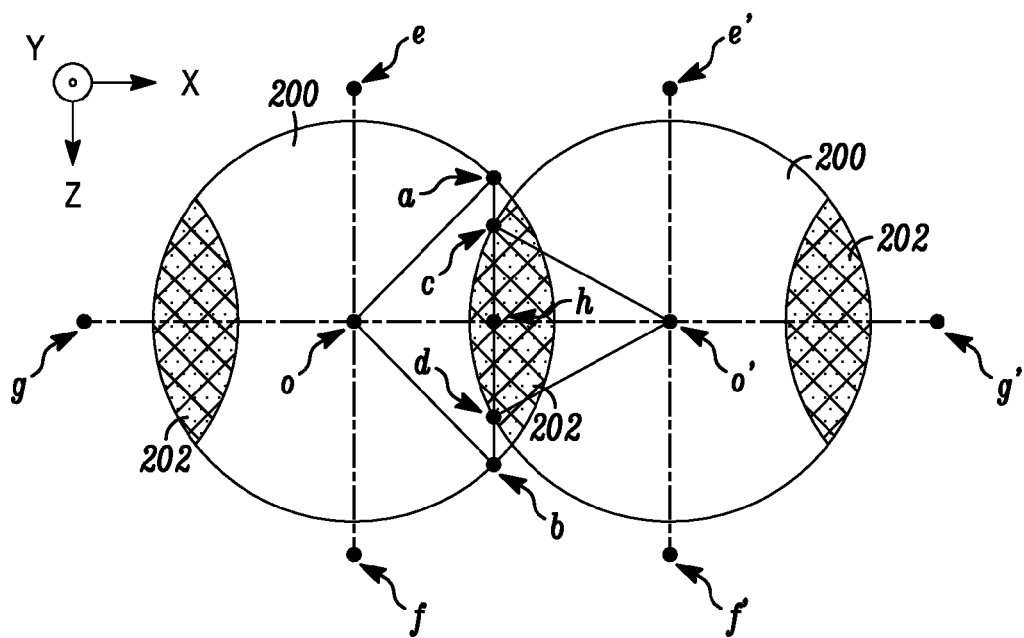
FIG. 21 is an end view of the conic beams of light of FIG. 20 illustrating the overlapping thereof.

Because the distance between the centerlines of the collimators 66 of the same color exceeds the width of those collimators 66, spatial color non-uniformity exists when the beams are projected on planes normal to the y-axis direction along the upper waveguide 56. The non-uniformity for the red and blue LEDs 60 is worse than that for the green LEDs 60 because $S_{red}$ and $S_{blue}$ are twice $S_{green}$. This color non-uniformity effect is illustrated in FIG. 21 where centerlines e-f, e'-f', and g-g' pass through points o and o' (i.e., "o points" and "o' points") at the centers of two circular cross-sections of beams projected from the k points in FIG. 20. The distance separating centerlines e-f and e'-f' in FIG. 21 equals $S_i$ shown in FIG. 20. However, the distance of centerline g-g' in FIG. 21 from a line through the k points in FIG. 20 exceeds $B_i$ in FIG. 20. This causes circular beam cross-sections 200 shown in FIG. 21 to overlap in areas 202. The overlap occurs because the size of the circular beam cross-sections 200 increases linearly with their distance from the k points in FIG. 20 while the separation, $S_i$, between adjacent beam centerlines remains fixed. The beams have an approximately truncated lambertian property at cross-sections 200 in FIG. 21. It should be noted that the truncated lambertian approximation is best when the circular cross-section CPCs are hollow rather than refractive and when the circular input port apertures thereof are overfilled rather than underfilled. The overlapping areas 202 within neighboring cross-sections 200 have approximately double the flux density of non-overlapping areas.

Spatial non-uniformity manifests itself as stripes parallel to the y-axis direction. Accordingly, there is spatial non-uniformity along lines parallel to the x-axis direction and spatial uniformity along lines parallel to the z-axis direction. This may not be apparent upon first glance at FIG. 21 because the flux density along line a-b is greater along the c-d portion of that line than it is along its a-c and d-b portions. However, owing to smearing in the z-axis direction, as was described earlier, any non-uniformity along a line parallel to the z-axis direction is "smeared out." Smearing in the z-axis direction is caused not only by arrays of contiguous beam centers o and o' in FIG. 21 displaced along lines e-f and e'-f', but also by TIR of the diverging beams from top and bottom surfaces of the upper waveguide, which folds the beams over so that their Z-axis direction propagation component reverses at the TIR interface. The resulting effect of this TIR is to fold beam cross-sections 200 over along lines parallel to g-g' in FIG. 21, which represent intersections with the top and bottom surfaces of the upper waveguide.

Still referring to FIG. 21, consider lines parallel to the z-axis direction, which span the circular cross-section 200 centered on the point o. Owing to the smearing effect in the z-axis direction, the flux density of the beam along these lines is proportional to their different lengths when displaced at different distances in the x-axis direction. Accordingly, the maximum flux density exists along line e-f through the point o because the diameter of the beam cross-section is on this line. Similarly, the maximum flux density across another circular beam cross-section centered on the point o' is along line e'-f' through point o'. The flux density within a circular beam cross-section along a line parallel to the z-axis direction may be expressed, as a function of its distance, X, $$I(X) = I_{max} \sqrt{(R^2 - X^2)/R^2} \quad (2)$$

Imax is the maximum flux density along line e-f through point o or o', X is the distance of line a-b from center point o, and R is the radius of the beam cross-section, and where $-R \leq X \leq +R$.

Parameter, x, is defined as $x = X/R$, where x is X expressed as a fraction of R. Therefore, $I(x) = I_{max} \sqrt{1-x^2}$. To normalize flux density relative to the maximum flux density, Imax is set to unity. Accordingly, the relative flux density I(x) along line a-b is $$I(x) = \sqrt{1-x^2} \quad (3)$$

where $-1 \leq x \leq 1$.

If beam cross-sections 200 centered on the points o and o' in FIG. 21 are separated by a distance, $S_i$, where Zero $< S_i < 2R$, then the cross-sections of these beams will overlap in the overlapping areas 202. If line a-b fails to pass through overlapping areas 202, then the cross-section centered on the point o' does not contribute to the flux density along line a-b and the flux density along line a-b is given by Equation 3. If line a-b passes through the overlapping areas 202, then the cross-sectional area centered on the point o' contributes to the flux density along line a-b along line segment c-d. The span between centers o and o' equals $S_i$.

In a manner similar to the way X was expressed as a fraction of R, $S_i$ may also be expressed as a fraction of R. In effect, this makes R the length unit for expressing distances.

Accordingly, $s_i=S_i/R$, which makes $s_i$ the distance between centerlines of projected beams of the same color normalized with respect to R.

Although $S_i$ is invariant for a collimator design choice, $s_i$ varies inversely with R, and R increases linearly with beam propagation distance during the beam's first pass through the upper waveguide.

The distance of the center point o' from line segment c-d equals o'-h, which is defined as X' and where x'=X'/R and x'=$s_i$×x. Substituting $s_i$–x for x in equation 3 yields I', which is the normalized flux density along line c-d. Therefore, for a selected value of $s_i$ $$I'(s_i, x)=\text{sqrt}[1-(s_i-x)^2]\qquad(4)$$

The sum of flux density contributions from beam cross-sections centered on o and o' equals $I(x)+I'(s_i, x)$.

The spatial non-uniformity illustrated in FIG. 21 may be lessened as the normalized distance $s_i$ is reduced between adjacent circular cross-sectional area center points o and o' along line g-g'.

Figure 22:
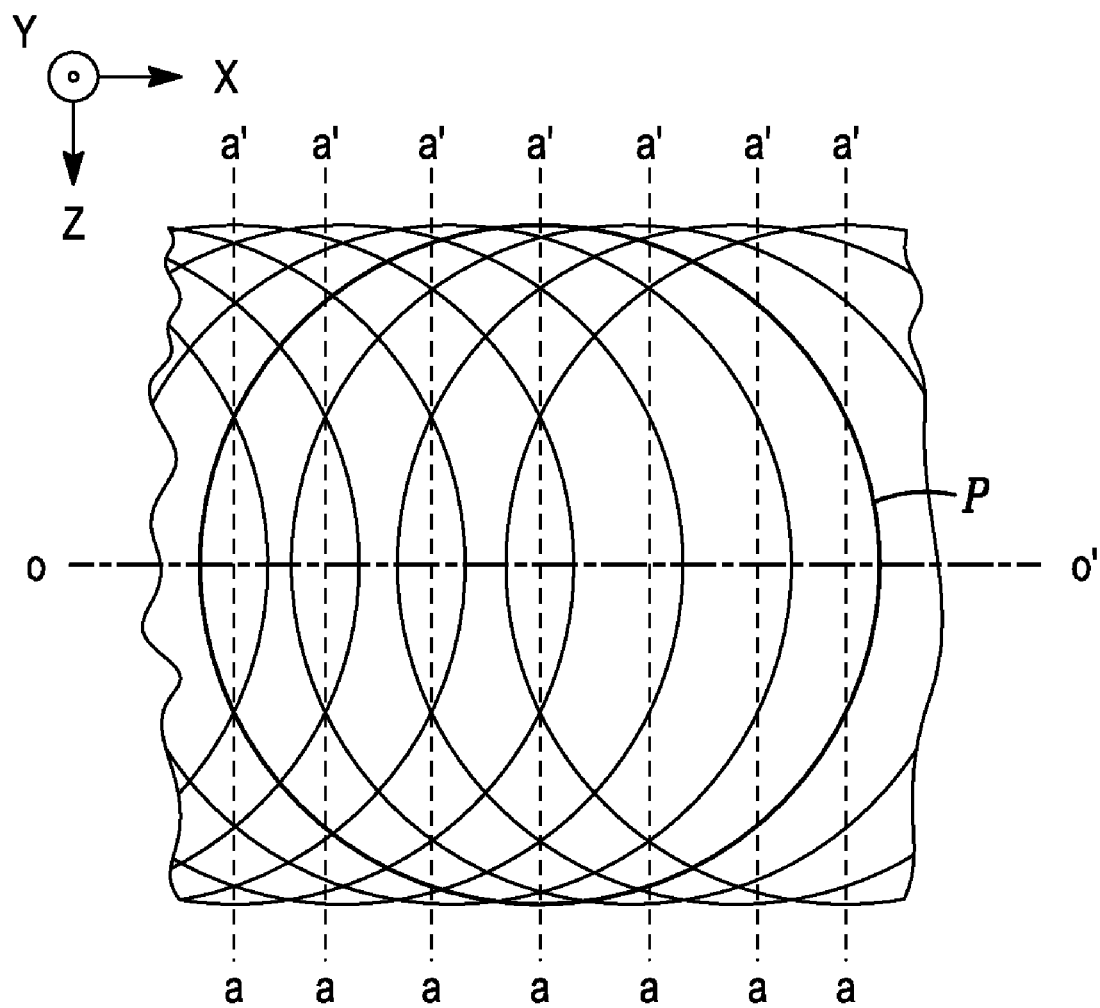
FIG. 22 is another end view of the conic beams of light of FIG. 20 further illustrating the overlapping thereof.
Figure 23:
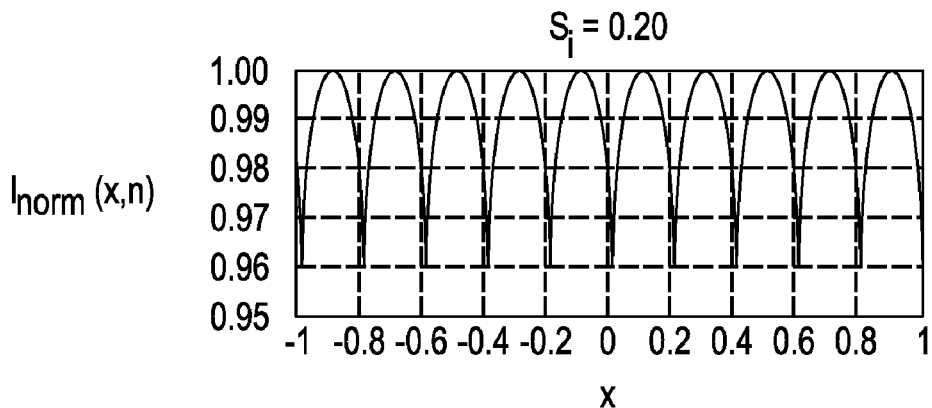
FIGS. 23-37 are graphical illustrations of spatial flux density uniformity of light extracted from in the upper waveguide, according to various embodiments of the present invention.
Figure 24:
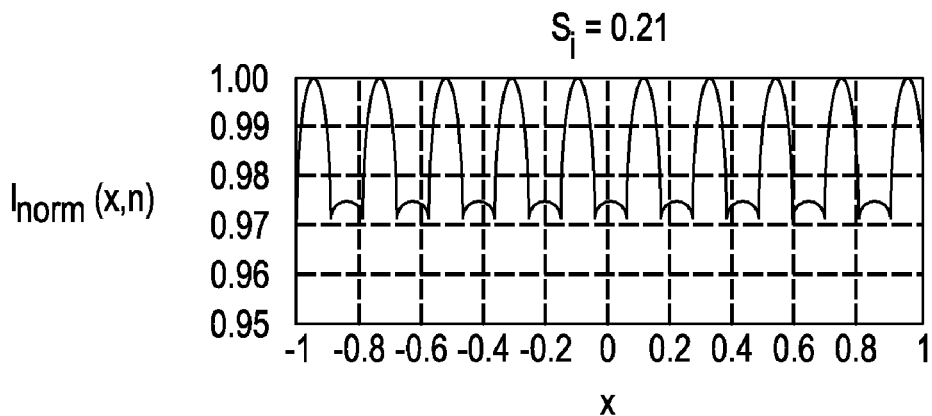
Figure 25:
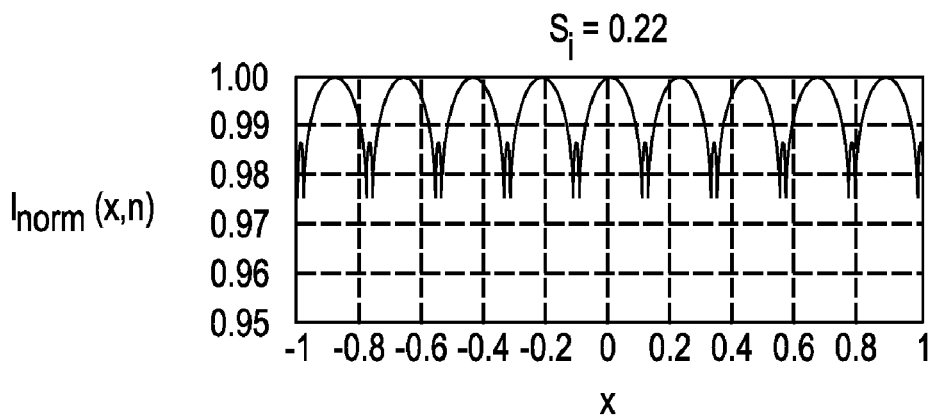
Figure 26:
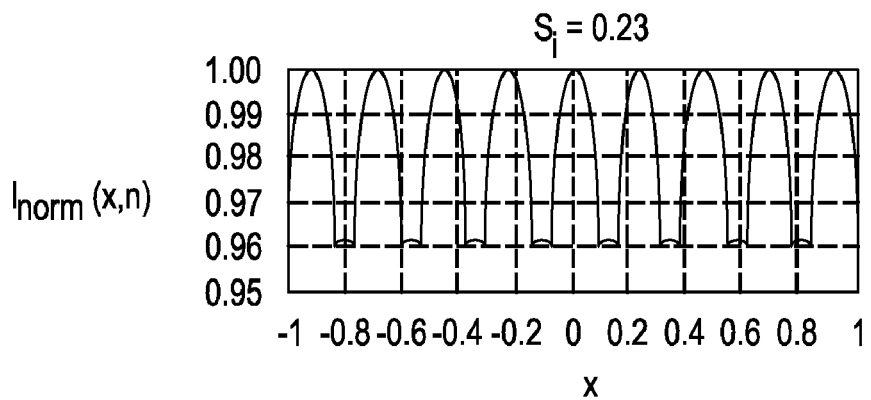
Figure 27:
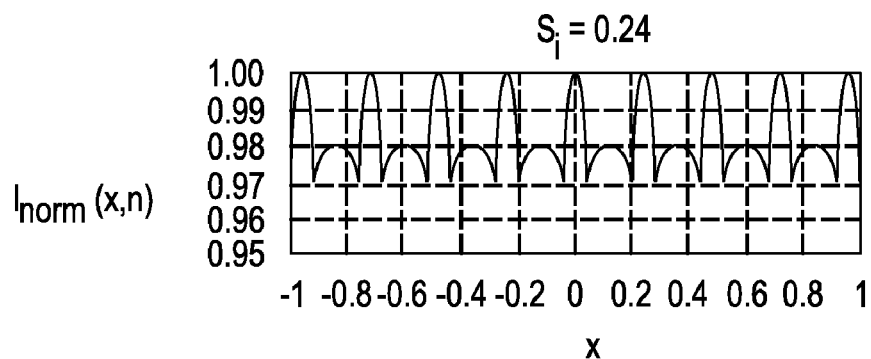
Figure 28:
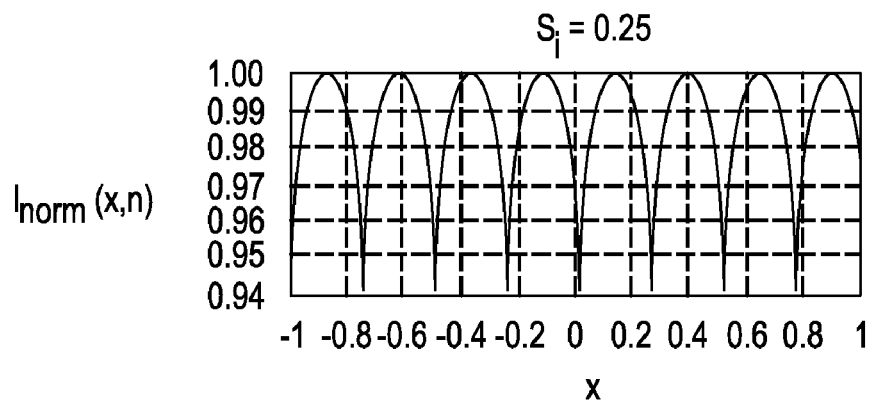
Figure 29:
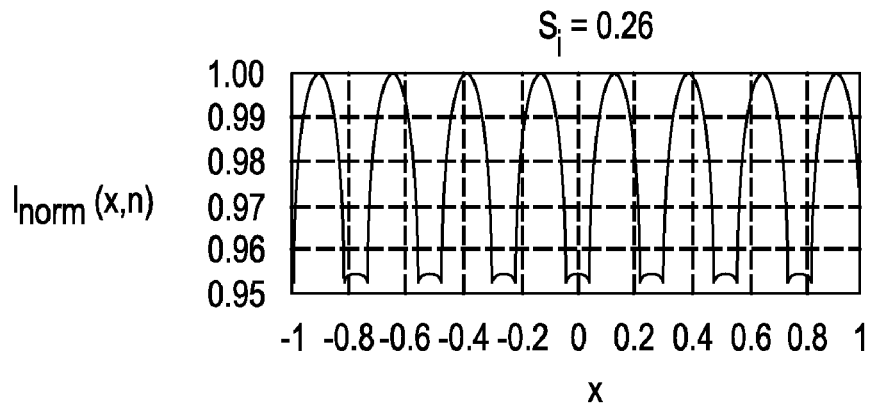
Figure 30:
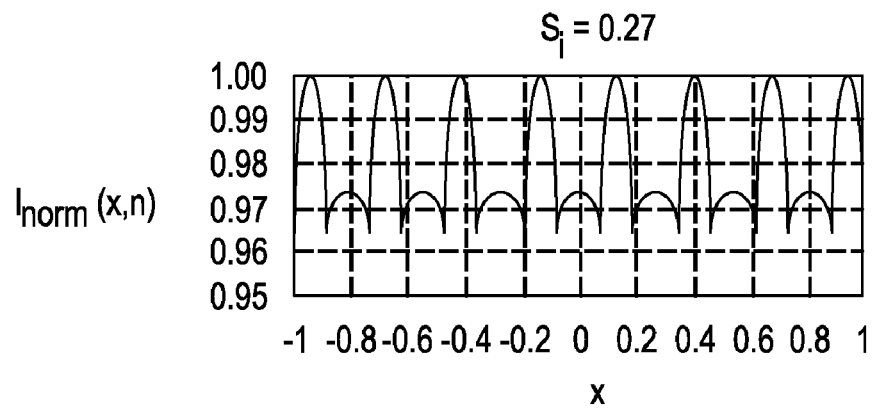
Figure 31:
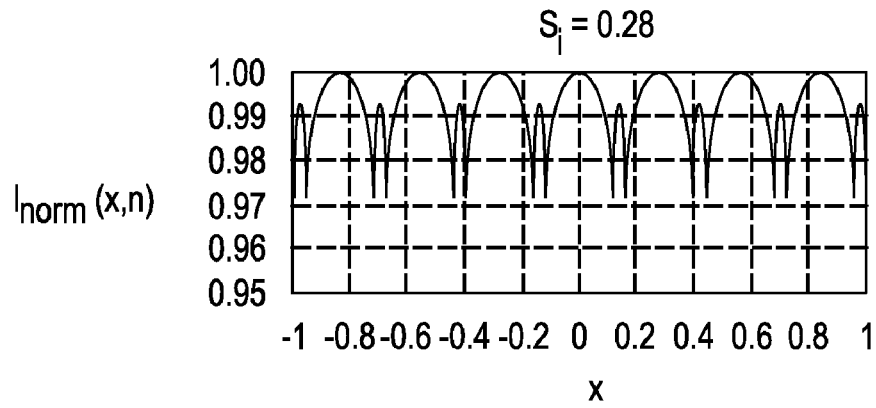
Figure 32:
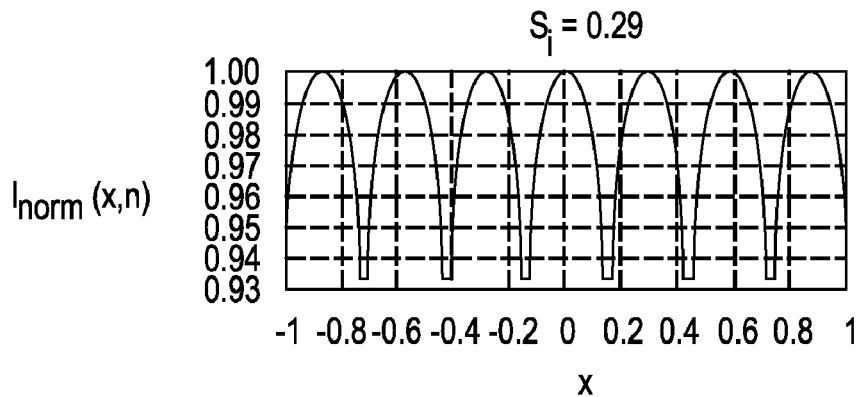
Figure 33:
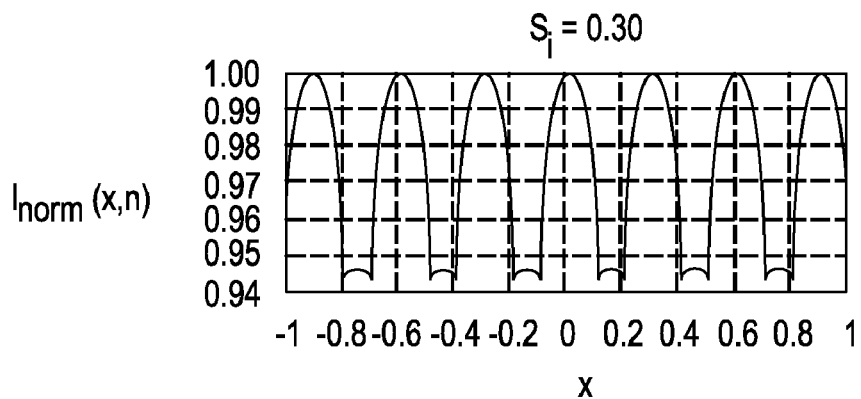
Figure 34:
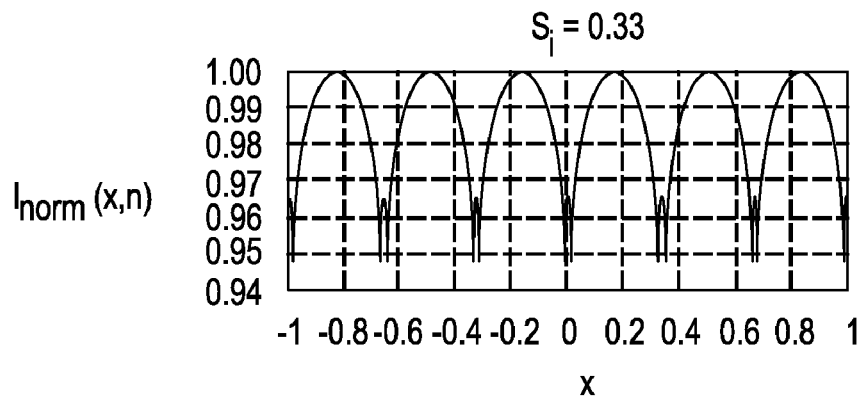

In FIG. 22, consider circular beam cross-sectional area P and an array of multiple circular beam cross-sectional areas (of which P is a part), which overlap P. The center points (of these beam cross-sectional areas) at the intersection of lines a-a' with line o-o' of the circular areas of this array are distributed in equal intervals on line o-o'. Line o-o' is parallel to the x-axis direction and lines a-a' are parallel to the z-axis direction. The resulting improvement in spatial uniformity in FIG. 22 over that in FIG. 21 is due to the overlapping of cross-sectional areas of multiple beams with the area of P.

The uniformity for a selected value of $s_i$ is $$I(s_i, x, n) = \sum_n \text{Re}\{sqrt[1-(ns_i-x)^2]\}\qquad(5)$$

where n is a set of consecutive positive and negative integers inclusive of zero. With further regard to Equation 5, as previously defined, $s_i=S_i/R$, where $S_i$ is the distance parallel to the x-axis direction between adjacent beam circular cross-sectional areas of the same color; and where R is the radius of the circular cross-sectional areas, and x=X/R, where X is distance in the direction parallel to the x-axis direction from the center of circular beam cross-sectional area P in FIG. 22, and where R is the radius of the circular cross-sectional area P.

$-1 \leq x \leq +1$ $-2 \leq ns_i \leq +2$

The function, Re, restricts the calculation to the real part of a complex number. Accordingly, Equation 5 excludes square roots of negative numbers.

The maximum value of $I(s_i, x, n)$ is $I_{max}$. Therefore, the normalized spatial flux density uniformity function for a selected value of $s_i$ is given by $$I_{norm}(s_i, x, n)=I(s_i, x, n)/I_{max}\qquad(6)$$

$I_{norm}(s_i, x, n)$ is plotted for various selected values of $s_i$ in FIGS. 23-34. $I_{norm}(s_i, x, n)$ varies between its maximum and minimum values of $\max I_{norm}$ and $\min I_{norm}$.

Uniformity can be expressed as $\Delta I_{norm}/\max I_{norm}$, where $\Delta I_{norm}=(\max I_{norm}-\min I_{norm})$. If $\Delta s_i \text{NORM}(s_i)$ is defined as uniformity, then $$\Delta s_i\text{NORM}(s_i)=\Delta I_{norm}/\max I_{norm}\qquad(7)$$

Figure 35:
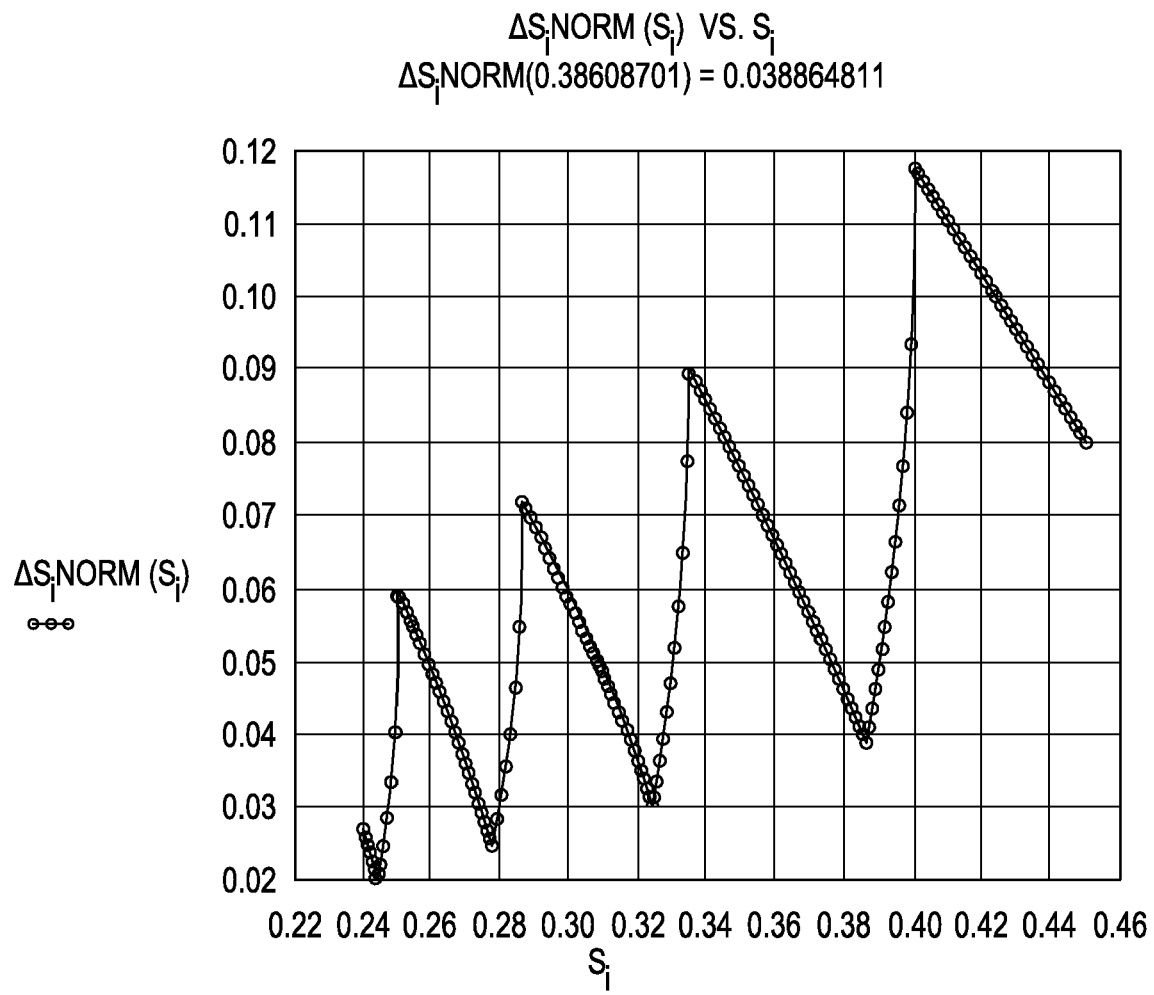

FIG. 35 is a plot of $\Delta s_i\text{NORM}(s_i)$ versus $s_i$. For a given $s_i$ region, it is advantageous to select a $s_i$ value at the bottom sharp points of this plot. Accordingly, these local minima of $\Delta s_i\text{NORM}(s_i)$ occur near $s_i$ values of 0.245, 0.279, 0.325, and 0.386 on this plot.

Figure 36:
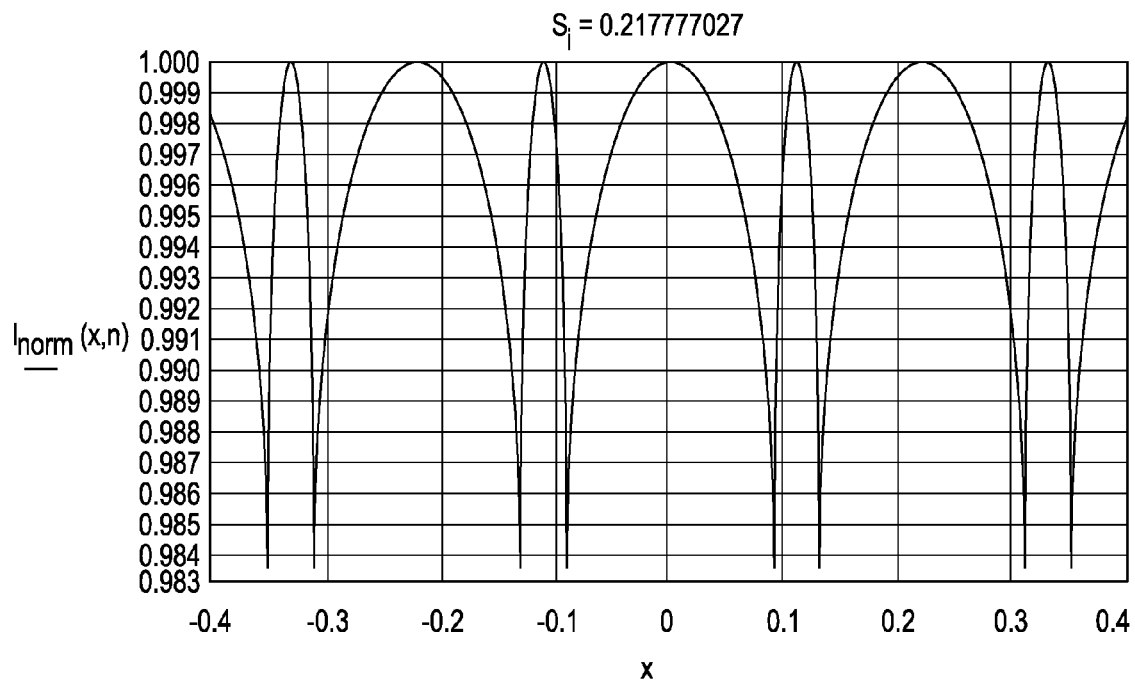
Figure 37:
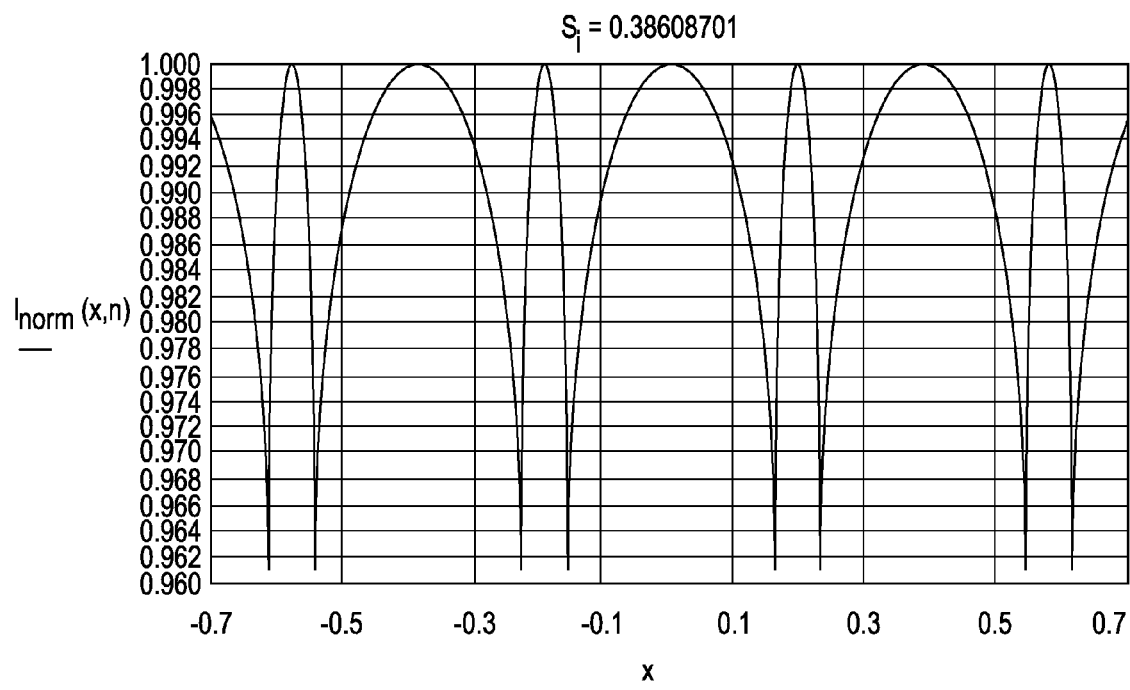

FIGS. 36 and 37 are plots of $I_{norm}(s_i, x, n)$ versus x for local $s_i$ minima of 0.217777027 and 0.38608701. These represent calculated uniformities of about ±0.83% and ±1.95% respectively. Actual uniformities are somewhat better than this owing to smearing in the x-axis direction. The calculation is conservative because it fails to account for smearing in that it assumes the conical beams project only from the k points at the centers of the collimator output ports rather than from a superposition of an infinite number of points across each of those ports.

It is characteristic of a CPC collimator to generate an approximately truncated lambertian output when, as is the case with a preferred embodiment of the present invention, it is fed by a non-truncated lambertian input. Accordingly, the angular span of its lambertian input flux has a conical distribution half angle ($\theta_{in}$) of 90°, and the span of its truncated lambertian output flux has a conical distribution half angle of approximately $\theta_{out}$. Note that $\theta_{in}$ and $\theta_{out}$ are for flux projections into air medium with $\theta_{in}$ projecting from the LED emitting surface and $\theta_{out}$ projecting from the CPC outputs (or output apertures 129). In the preferred embodiment, as previously discussed, the LED emitting surfaces are actually in contact with the (CPC) input ports 68 (FIG. 2), which is a dielectric material interface. Alternatively, for superior truncated lambertian approximations, the LED emitting surfaces may overfill the input ports of hollow CPC (or input) portions 70 of the collimators. The uniform cross-section (or output) portions 72 may remain dielectric-filled.

It should be noted that the light from the CPC output ports 69 (FIG. 4) do not project into air. Rather, the projected light beams remain within a dielectric refractive medium. The behavior of these input and output beams within refractive medium will be discussed later.

The following law of the conservation of étendu determines the relationships between input and output parameters of the CPCs:

$$A_{in}\sin^2(\theta_{in})=A_{out}\sin^2(\theta_{out})\qquad(8)$$

In Equation 8, $\theta_{in}$ is the conical halfpeak divergence angle of the light beam projected from the LED into air, $\theta_{out}$ is the conical halfpeak divergence angle of the light beam projected from the CPC output apertures 69 into air, $A_{in}$ is the area of the CPC's input port 68, and $A_{out}$ is the area of the CPC's output aperture 69. It follows that $$A_{out}=A_{in}\sin^2(\theta_{in})/\sin^2(\theta_{out})\qquad(9)$$

Figure 4:
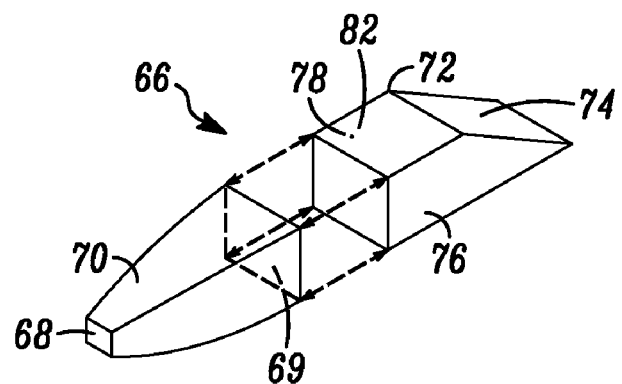
FIG. 4 is an exploded isometric view of the collimator of FIG. 3.

As previously discussed, the collimators 66 of FIG. 2 each comprise a CPC portion 70 and a uniform cross section portion 72 as illustrated in FIG. 4. The uniform cross section portion 72 does not change the collimation of the light, which enters it. Accordingly, the conical halfpeak divergence angle that would project into air from a collimator output port 129 is the same as that which would project into air from CPC output port 69.

As previously mentioned, in a preferred embodiment, the collimators' input port 68 area, $A_{in}$, is determined by the size and shape of the LEDs' 1 mm by 1 mm square emitting surface, which contacts the 1.1 mm by 1.1 mm square CPC collimator's input port 68. Accordingly, $A_{in}$=1.21 mm$^2$.

The flux projected from the LED emitting surface is close to lambertian. Accordingly, the conical halfpeak divergence half angle $\theta_{in}$ projected into the collimator input port from air is given by $\theta_{in}=90°$. The halfpeak divergence angle $\theta_{out}$ projected into air from the CPC output apertures 69, or from the collimator output apertures 129 is selected to be 7.5° in this preferred embodiment. By substitution of the $A_{in}$, $\theta_{in}$, and $\theta_{out}$ values into Equation 9, $$A_{out}=(1.21)(1)/\sin^2(7.5°) \tag{10}$$

The result is $A_{out}=71.022$ mm².

The collimators 66 were previously defined to be, in one embodiment, monolithic elements including the two sections 70 and 72 shown in FIG. 4. The collimation generated by the input section 70 is governed by the equations found in section 4.3 of "High Collection Nonimaging Optics", by W. T. Welford and R. Winston, Academic Press 1989, ISBN 0-12-742885-2:

$$a=a'/\sin \theta_i \tag{11}$$

where $\theta_i$ is $\theta_{out}$, the conical halfpeak divergence angle of the light beam projected from the CPC output apertures 69, a' is the half span (from side-to-side) of the CPC input ports 68, and a is the half span (from side-to-side) of the CPC output apertures 69. Implicit in this equation is a lambertian light input at the 2a' by 2a' CPC input ports 68, which is what the LEDs generate.

For the 1.1 mm by 1.1 mm CPC input ports 68 of the preferred embodiment, a'=0.55 mm, and for the selected output aperture 69 collimation of the preferred embodiment, $\theta_i=7.50°$. Therefore, a=0.55/sin7.5°=4.2137 mm. Accordingly, the square output port is 2a by 2a, or 8.4274 mm by 8.4274 mm and its area is 71.022 mm². This is in agreement with the results of the étendu calculation performed in Equation 10.

From equation 4.4 of section 4.3 of "High Collection Nonimaging Optics,"

$$L_{air}=(a+a')\cot \theta_i, \tag{12}$$

where $L_{air}$ is the length of the CPC section in air. Therefore, $L_{air}=(4.2137+0.55)\cot(7.5°)=36.184$ mm.

It should be noted that the equations in section 4.3 are for hollow CPCs. Since the collimators 66 shown are dielectric-filled elements, it is necessary to have a set of equations that account for the propagation of the beams within refractive media.

Upon entering the input port of a refractive CPC from air, a beam with a divergence half angle, $\theta_{in}$, would have a divergence half angle of $\theta N_{in}$ within a medium having a refractive index of N. By application of Snell's law, $$\theta N_{in}=\sin^{-1}[(\sin \theta_{in})/N] \tag{13}$$

For a CPC made of Topas, N=1.53; and for $\theta_{in}=90°$, $\theta N_{in}=40.8132°$.

Similarly, upon exiting the output port of a refractive CPC into air, a beam exiting with a divergence half angle of $\theta_{out}$ in air would have a divergence half angle of $\theta N_{out}$ when exiting into refractive medium. By further application of Snell's law, $$\theta N_{out}=\sin^{-1}[(\sin \theta_{out})/N] \tag{14}$$

Figure 3:
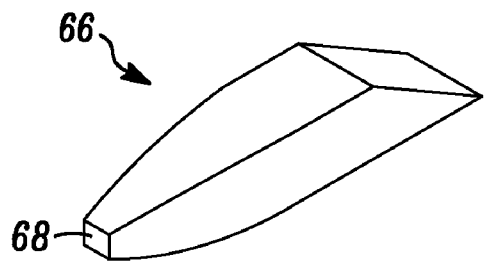
FIG. 3 is an isometric view of a collimator within the lower waveguide of FIG. 2.

For a divergence half angle of $\theta_{out}=7.5°$ exiting into air, $\theta N_{out}$ calculated for N=1.53 for the CPC Topas medium for collimator 66 of FIG. 3 is given by $\theta N_{out}=4.8939°$.

Referring again to Equation 9, $$A_{out}=A_{in}\sin^2(\theta_{in})/\sin^2(\theta_{out}) \text{ (in air)} \tag{15}$$

$$A_{out}=A_{in}\sin^2(\theta N_{in})/\sin^2(\theta N_{out}) \text{ (in Topas)} \tag{16}$$

Substituting $\theta N_{in}=40.8132°$, $\theta N_{out}=4.8939°$, and $A_{in}=1.21$ mm² from previous calculations, $A_{out}=71.022$ mm². Since this agrees with the calculation made by applying Equation 9 to the hollow CPC parameters, this indicates that the CPC input and output port areas may remain unchanged for hollow CPC's filled with a dielectric medium. However, the following discussion shows that their lengths differ.

Figure 38:
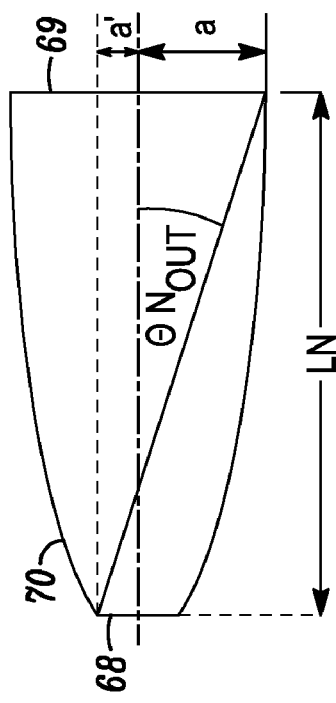
FIG. 38 is a side view of a variable cross section portion of the collimator of FIG. 4.

FIG. 38 illustrates the dielectric-filled collimator, or CPC, input section 70 of FIG. 4. The half-spans of the input port 68 and the output port 69 of the input section 70 are shown as a' and a respectively. The length of this CPC is shown as LN. Also shown in FIG. 38 is a marginal light ray that, after TIRing from the CPC, propagates from the top edge of its input port 68 to the bottom edge of its output port 69. This ray, propagating at an angle of $\theta N_{out}$ to the central axis 96, defines the divergence half angle of the beam inside the refractive medium of the CPC, which is incident upon the edge of CPC output port 69. As previously mentioned, beams projected from collimators with square cross-section CPC portions have square angular divergences of approximately $2\theta N_{out} \times 2\theta N_{out}$. The geometry of the CPC input section 70 shown in FIG. 38 indicates that the length, LN, of the CPC section 70 is defined by $$LN=(a+a')\cot(\theta N_{out}) \tag{17}$$

Note that Equation 17 has the same form as Equation 12, which applies to hollow CPCs. Substitution of previously derived values of a', a, and $\theta N_{out}$ (which are 0.55 mm, 4.2137 mm, and 4.8939 respectively) into Equation 17 yields LN=55.64 mm.

In terms of the refractive index (N) of the CPC section 70 in FIG. 4, the output divergence half angle ($\theta_{out}$) in air, and the half span (a') of the CPC input port 68, the length, LN, of a dielectric-filled CPC can also be calculated via $$LN=a'/(1+\sin \theta_{out})/\sin^2\theta_{out}]\mathrm{sqrt}(N^2-\sin^2\theta_{out}) \tag{18}$$

Substituting previously selected values (7.5° for $\theta_{out}$, 1.53 for N, and 0.55 mm for a') into Equation 18 yields LN=55.636 mm. This agrees with results obtained for LN with Equation 17.

Figure 5:
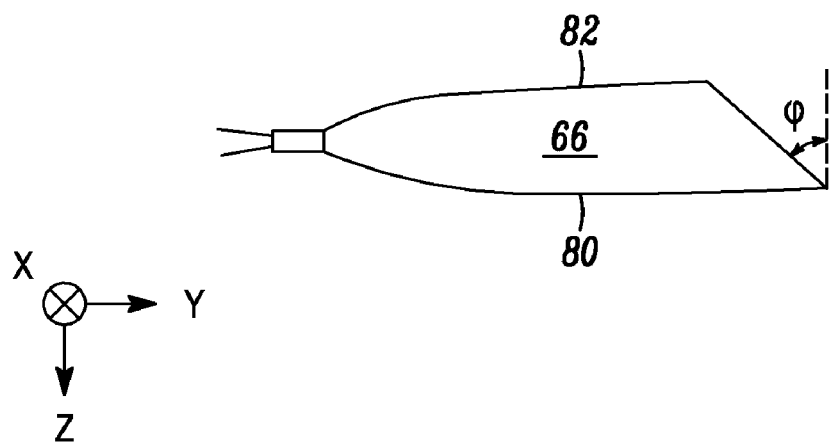
FIG. 5 is a side view of the collimator of FIG. 3 with a LED light source adjacent to an input port thereof.

Referring now to the output section 72 in FIG. 4, the angle $\phi$ in FIG. 5 is set to the minimum value that ensures no failure of TIR for incident rays projected from CPC input section 70. The angle $\phi$ is a rotation angle about the negative x-axis direction of a plane normal to the y-axis direction. Since the divergence half angle of the beams projected from CPC input sections 70 within the Topas medium of the collimators is 4.8939° (as calculated for $\theta N_{out}$ via Equation 14), $\sin(\phi-\theta N_{out})=(1/N)$ for TIR to prevail. Therefore $\phi$ is given by $$\phi=\sin^{-1}(1/N)+\theta N_{out} \tag{19}$$

Substituting for N=1.53 and $\theta N_{out}=4.8939°$ yields $\phi=45.7071°$. The length of the output section 72 of FIG. 4 has no effect on the projected divergence half angle of the collimators 66.

In the particular embodiment discussed above, the thickness of the collimators 66 is 2a, which was shown previously to be 8.4274 mm. The thickness of the upper waveguide 56 is 10.3035 mm as determined by the intersection of the upper waveguide's top surface 86 and the first reflector 98. In a preferred embodiment, some of the specific components of the system have the following characteristics. The lower and upper adhesive layers 108 (FIG. 12) are each 0.025 mm thick and made of ARclear8154 which is available from Adhesive Research of Glen Rock, Pa., USA. The extraction film 112 (FIG. 12) is 0.062 mm thick and made of Topas. The light absorbing layer 110 is made of polycarbonate or acrylic doped with a light-absorbing dye. It should be noted that the light absorbing layer 110 may not add to the thickness of the backlight 44 because its thickness occupies the space between the structured portion of the extraction film 112 and the lower adhesive layer 108. The prismatic film 130 is 0.062 mm thick and is made of polycarbonate. As such, in one embodiment, the total backlight thickness is approximately 18.9 mm, which is less than 0.75 inches.

Regarding the length of the backlight 44, color mixing uniformity is a function of si. FIG. 35 indicates that uniformity improves with decreasing $s_i$ values (assuming that the selected si values are near the bottom sharp points of this plot). Previously, $s_i$ was defined as $s_i=S_i/R$, where $S_i$ is the distance between the centerlines of the collimators that project light beams of color i. The distance between adjacent centerlines is equal to the width of the collimators and was also shown to equal ¼ of $S_{blue}$, ¼ of $S_{red}$, and ½ of $S_{green}$. Since larger Si's require longer color mixing lengths, in a preferred embodiment, $S_i=S_{blue}=S_{red}=2S_{green}$. The $S_i$ selected for the preferred embodiment is that of the blue and red colors because if the smaller $S_{green}$ were selected, the red and blue colors would not mix properly. Accordingly, to mix red, blue, and green, $S_i=8a$, where a was calculated to be a=0.55/sin7.5°. Therefore, $S_i=8a=33.7097$ millimeters.

R was defined as the radius of the projected light beam cross-section at some distance from the collimator output ports. From FIG. 20 it can be seen that $$R=Lcm \tan(\theta_n), \quad (20)$$

where Lcm is the light beam propagation distance from k, which is required for color mixing, and θn is the collimation half angle of the beam inside medium having a refractive index of n.

Since $R=S_i/s_i=Lcm \tan(\theta_n)$, $$Lcm=(S_i/s_i)\cot(\theta_n) \quad (21)$$

As discussed above, Equation 7 calculates the uniformity parameter $\Delta s_i NORM(s_i)$. FIG. 35 plots $\Delta s_i NORM(s_i)$, and as previously mentioned, shows local minima for $\Delta s_i NORM(s_i)$ occurring near $s_i$=0.245, 0.279, 0.325, and 0.386. More accurate $s_i$ minima were calculated and plotted for $\Delta s_i NORM(s_i)$ in FIGS. 36 and 37. These plots show the uniformity for $s_i$=0.217777027 to be about ±0.83% and the uniformity for $s_i$=0.38608701 to be about ±1.95%. The $s_i$ value of 0.38608701 is selected for the preferred embodiment.

Since the entire unfolded $L_{cm}$ propagation length occurs in the upper waveguide 56 (FIG. 1), n=1.49 and, by application of Snell's Law and the Law of reflection to the geometry of FIG. 6, $\theta_n=\theta_{49}=5.0257°$, where $\theta_{49}$ is the $\theta_n$ in FIG. 20 representing the projected collimation half angle of light in its first pass through the upper waveguide 56. From Equation 21, the color mixing length in the upper waveguide 56 alone is $L_{cm}$=(33.7097/0.38608701)/tan 5.0257°=992.8 mm or 39.09 inches.

To shorten $L_{cm}$ one can degrade collimation, which would decrease $s_i$. Alternatively, one can increase $s_i$, which would degrade uniformity. To shorten $L_{cm}$, one can also simultaneously degrade collimation and increase $s_i$ to shorten $L_{cm}$.

A superior way of shortening $L_{cm}$ is to provide color mixing in the lower waveguide 52 in addition to that in the upper waveguide 56. In this case, $L_{cm}$ represents the length of the backlight 44 in FIG. 1. Color mixing in the lower waveguide 52 can be done by lengthening the output sections 72 of the collimators 66 shown in FIG. 4. Then, by applying a transmissive refractive index matching material to the adjacent sides of the collimators 66, one can prevent the colored light projected from CPC input sections 70 from remaining confined inside the output sections 72. This would provide color mixing by eliminating TIR at the adjacent side interfaces of the output sections 72 and allow rays to pass through these interfaces into neighboring output sections 72.

An even better way to provide color mixing in the lower waveguide 52 is to make a monolithic element out of all of the output sections 72. By eliminating the side interfaces entirely, there is no need for adding an index-matching material between the side interfaces. In such an embodiment, an optional transmissive index matching material such as an appropriate adhesive may be applied between the output ports 69 of the CPC input sections 70 and the single monolithic output section.

To calculate the length of upper waveguide 56 when color mixing also exists in lower waveguide 52, the different collimations within the upper and lower waveguides 56 and 52 may be considered. In an embodiment in which output sections 72 are sufficiently long to bring the input ports 68 of CPC input sections 70 in line with the second reflector 100 on the upper waveguide 56 (FIG. 1), the length of upper waveguide 56 with a refractive index of 1.49 (i.e., "$L_{49}$") is given by $$L_{49}=[(S_i/s_i)+L_{53}\tan(\theta_{53})]/[\tan(\theta_{53})+\tan(\theta_{49})], \quad (22)$$

where, for the preferred embodiment, $S_i$=33.7097 mm, $s_i$=0.38608701, $L_{53}$ (the length of the CPC input section 70 with a refractive index of 1.53)=55.6357 mm, $\theta_{53}$ (the collimation ½ angle within the output sections 72)=4.8939°, $\theta_{49}$ (the collimation ½ angle within the upper waveguide 56)=5.0257°.

Upon substitution of the above values into Equation 22, the length $L_{49}$ of the backlightg 44 (i.e., the length of the collimators 66) is 530.5 mm, or 20.89 inches.

Regarding angular uniformity, as location on the second reflector 100 (FIG. 1) varies in the x-axis direction in the preferred embodiment, flux from red or blue LEDs incident on the second reflector 100 at the completion of the first pass through upper waveguide 56 has a spatial uniformity of approximately ±1.95%. However this flux fails to possess uniform directional properties. As previously discussed, the LEDs in FIG. 2 have common centerlines with their respective collimators 66. The centerlines corresponding to LEDs of the same color are separated by a distance $S_i$, which can be $S_{blue}$, $S_{red}$, or $S_{green}$. These centerlines are also the centerlines of the diverging light beams projected from their respective collimators.

Referring again to FIG. 20, the centerlines for diverging beams of the same color pass through the k, f, and g points and are separated by $S_i$. The k points emanate from the virtual position of the center of the output apertures 129 of the lower waveguide 52 after reflection from the first reflector 98 of the upper waveguide 56 (FIG. 1). If upper waveguide 56 had a length of $B_i$, the e and f points would lie along the second end 90 of upper waveguide 56. Similarly, if the upper waveguide had a length of 2Bi, then the g and h points would lie along the second end 90 of upper waveguide 56. The solid lines diverging at angles $\theta_n$ from the k points indicate the truncated lambertian angular divergence span of the beams projected from the k points.

With continued reference to FIG. 20, arrowed solid lines and arrowed dashed lines are used to indicate flux propagation directions at the e and f points at distance $B_i$ and at the g and h points at distance $2B_i$. Solid lines show the presence of flux propagating in that direction from the k points. Dashed lines show flux propagation directions from the k points devoid of flux. This representation demonstrates that the configuration of the LED and collimator arrays shown in FIG. 2, which project spatially separated light beams of the same color, generate voids of flux projected in certain angular directions for light incident on the second reflector 100 at the completion of the first pass through the upper waveguide 56. Further, this angular uniformity defect varies with position in the x-axis direction across the second reflector 100 in that propagation directions devoid of flux change with position across the second reflector 100. As discussed above, the first and second sets of formations 104 and 106 on the second reflector 100 shown in FIG. 9 reduce this defect and its variability.

Two conditions may be utilized to eliminate the directional variability, or to reduce it to an acceptable level. Firstly, it is preferable to reflect the light incident on the second reflector 100 (FIG. 1) in a variety of different directions to ensure that there are no directional voids in the reflected light projected from points on the second reflector 100. This first condition is satisfied by the ripples illustrated in FIG. 9. Secondly, it is preferable to ensure there is incident flux density uniformity at end mirror 100, i.e. no voids or depleted levels of incident flux density lest there be little or no flux for the rippled mirror to reflect from selected portions of the second reflector 100. This second condition is satisfied by the previously mentioned provision of an incident flux density spatial uniformity of approximately ±1.95% at the surface of end mirror 100. Since the maximum angle variation magnitude is +/−.0257° conically distributed about the negative y-axis direction for light propagating in a first pass through the upper waveguide, the maximum slope variation of the required rippled mirror surface is selected to be half that, or +/−2.5129°. If the ripple has a sinusoidal thickness variation function, $y=y_{max}\sin(2\pi x/T)$, then the sinusoidal amplitude, $y_{max}$, that generates a maximum surface slope magnitude of 2.5129° is $$y_{max}=(T/2\pi)\tan(2.5129°), \quad (23)$$

which becomes $y_{max}=0.0070(T)$, where T is the period of the sinusoid ripple in the x-axis direction. For the preferred embodiment, a value of T=1 mm is selected. Therefore, the corresponding $y_{max}=7$ μm. The maximum slope magnitude of 2.5129° of the rippled surface is represented by slope angles β of lines b-b and c-c in FIG. 11.

Again, after reflection from the second reflector 100, the effect of this ripple pattern smears out the collimation in the x-axis direction by +/−5.0257° added to the conical surface of revolution component of +/−5.0257°. Accordingly, the angular elliptical cross-sectional area of the "smeared out" (or "smoothed out") beams possesses a minor axis of 10.514° and a major axis of 20.1027° (the latter being parallel to the x-axis direction).

In embodiments of the present invention, the parameters of the prismatic film 130 shown in FIG. 14, and its interaction with the parameters of the extraction film 112 (FIG. 12), the second reflector 100, and the collimation produced within the lower waveguide may be specifically engineered to suppress the creation of stray dysfunctional rays. Proper functioning of the prismatic film 130 requires the light projected into it to strike both tilted facets 138 and 140. If such parameters are not properly coordinated, certain light rays entering the first tilted facet 138 may miss second titled facet 140 entirely by passing over the top of it. The preferred embodiment has coordinated its parametric variables to avoid this defect.

Figure 39:
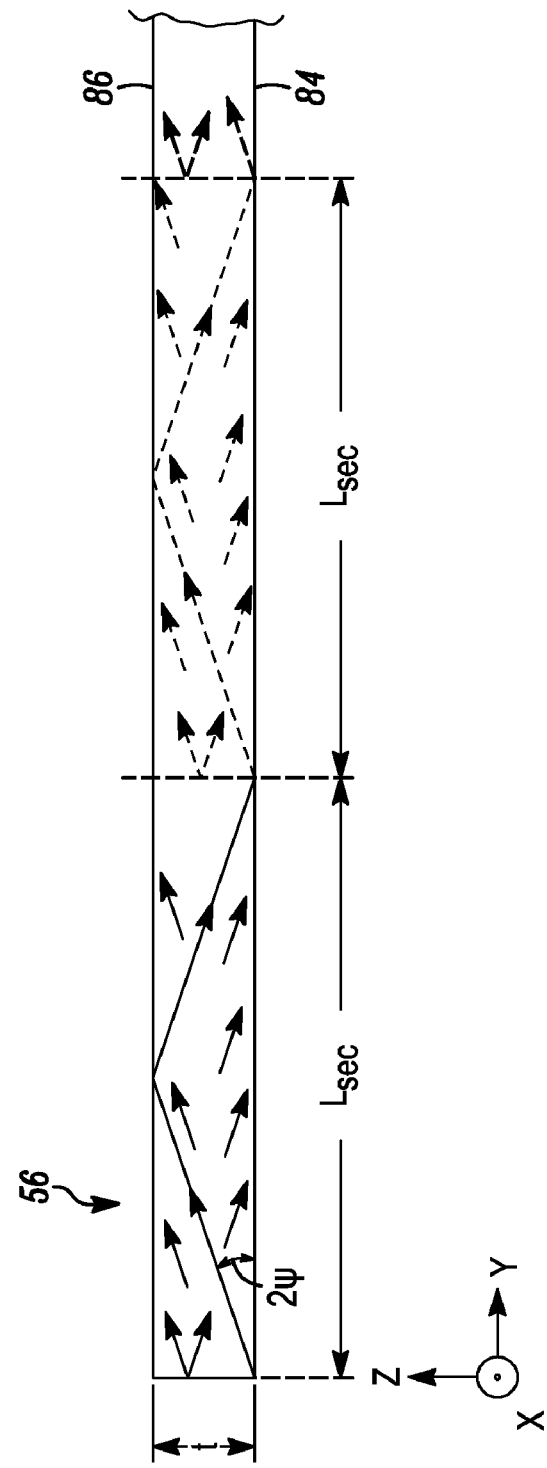
FIG. 39 is a side view of the upper waveguide of FIG. 1 illustrating the length of the spans over which uniform light extraction prevails.

Regarding the formation of a halftone pattern in the upper adhesive layer 114 (FIGS. 12 and 13), consider area flux density on the bottom surface 84 of the upper waveguide 56 adjacent to the upper adhesive layer. As shown in FIG. 39, the upper waveguide 56 may be considered to include multiple sections and/or section lengths $L_{sec}$. Note that the area flux density varies very little within the sections $L_{sec}$ along the bottom surface 84 of the upper waveguide 56 in spite of the light that leaks through the halftone dots (not shown in FIG. 39). This is because the central chief rays of the light lobes leaking through the halftone dots in one section $L_{sec}$ cannot hit that section again if TIRed instead of being transmitted by the halftone dots. Instead, the resulting depletion of flux does not show up significantly until the following $L_{sec}$ section. The upward and downward propagating lobes of light are each not completely collimated, as shown in FIG. 20, as the arrows represent the propagation directions of the central chief rays of the lobes. In the preferred embodiment, as previously discussed, the lobes span angles of +/−5.027° about their propagation directions in the z-y plane.

For the preferred embodiment, the lobe propagation directions are in the z-y plane and propagate at angles of +/−2ψ with the y-axis direction, where ψ is 9.6117°. From FIG. 39, $\tan(2\psi)=2t/L_{sec}$ and $L_{sec}=2t/\tan 2\psi$. Since the thickness of the upper waveguide 56=t=10.3035 mm in the preferred embodiment, $L_{sec}=59.0975$ mm. After reflection from the second reflector 100 begins the second pass through the upper waveguide 56, the zigzag mirror feature tilts of ψ° deflect the propagation directions of the reflected ray bundles upward and downward by a magnitude of 2ψ. With ψ being 9.6117°, it follows that, in the z-y plane, the propagation direction of ray bundles impinging on the bottom surface 84 of the upper waveguide 56 equals 19.2233° relative to the y-axis direction. Since the ray bundles impinging on the second reflector 100 possess a truncated lambertian distribution spanning an angular range of +/−5.0257°, they will span the downward angular propagation direction range between 24.2491 and 14.1976° (relative to the y-axis direction and in the z-y plane). These ray angles are sufficient to defeat TIR at the adhesive areas 122 interfacing with the bottom surface 84 of the upper waveguide 56.

Referring again to FIG. 39, since the waveguide length is 530.5 mm in the preferred embodiment, there are nine $L_{sec}$ sections. Ideally, the same amount of flux (or ⅑ of the flux incident on the first $L_{sec}$ section) should be extracted from each $L_{sec}$ section. If F1 is the flux incident on the first $L_{sec}$ section ($L_{sec}$1), then ⅑ of F1 is extracted along $L_{sec}$1, and F2 (the flux incident on the second $L_{sec}$ section ($L_{sec}$2))=⅘ of F1;

⅑ of F1 (or (⅛)(⅘) of F1) is extracted along $L_{sec}$2, and F3=⅞ of F1;

⅑ of F1 (or (⅐)(⅞) of F1) is extracted along $L_{sec}$3, and F4=⅙ of F1;

⅑ of F1 (or (⅙)(⅙) of F1) is extracted along $L_{sec}$4, and F5=⅚ of F1;

⅑ of F1 (or (⅕)(⅚) of F1) is extracted along $L_{sec}$5, and F6=⅘ of F1;

⅑ of F1 (or (¼)(⅘) of F1) is extracted along $L_{sec}$6, and F7=⅜ of F1;

⅑ of F1 (or (⅓)(⅜) of F1) is extracted along $L_{sec}$7, and F8=⅔ of F1;

⅑ of F1 (or (½)(⅔) of F1) is extracted along $L_{sec}$8, and F9=⅑ of F1; and

⅑ of F1 (or (1/1)(⅑) of F1) is extracted along $L_{sec}$9 (i.e., all incident flux along $L_{sec}$9 is extracted by means of a solid layer of adhesive devoid of air spaces along $L_{sec}$9)

Ideally, no flux would be left after extraction along $L_{sec}$9. Owing to the +/−5.027° angular spread about each lobe propagation direction, the extractions will differ somewhat from the above. A ray trace analysis program such as ASAP available from Breault Research Organization of Tucson, Ariz. or Light Tools available from Optical Research Associates of Pasadena, Calif. may be implemented to model the expected actual uniformity. Adjustments in the light extraction ratio of each halftone section may then be made accordingly.

Another advantage of the preferred embodiment involves the improvement in angular uniformity. As location on the surface of the second reflector 100 varies in the x-direction, flux from red and blue LEDs incident on second reflector 100 at the completion of the first pass through upper waveguide 56 in has a spatial uniformity of, for example, approximately ±1.95%. However, the angular content of this uniform flux density varies considerably for displacements in the x-direction across the second reflector 100. The magnitude of this angular variation is well-defined in that it cannot exceed the limits of collimation within the upper waveguide 56. As previously discussed, this collimation has a truncated lambertian characteristic. The collimation is bounded by an angular range, such as ±5.0257 in the z-y plane. More generally in three dimensional space, this collimation describes a set of light rays bounded by a cone that is a surface of revolution about the negative y-axis. This conical surface of revolution is generated by a line inclined at, for the above mentioned example, 5.0257° to the negative y-axis.

The tilted sawtooth-like features (i.e., the first set formations 104) on the second reflector 100 create a pair of two propagation lobes in the z-y plane upon reflecting each single lobe propagating in the negative y-direction during the first pass through the upper waveguide 56. In addition, the rippled surface of the second reflector 100 (i.e., the second set of formations 106) "smooths out" the flux propagation discontinuities existing at certain propagation angles in planes normal to the z-y plane. The resulting "smoothing out" effect reduces collimation in the x-direction and thereby changes the collimated beam cross-sections in planes normal to the axes of the lobes from circular to elliptical.

In the given example, the maximum angle variation magnitude in the z-y plane is ±5.0257°, the maximum slope variation of the required rippled mirror surface is half that, or +/−2.5129°. The resulting effect of this ripple smears out the collimation in the x-axis direction by ±5.0257° added to the conical surface of revolution component of ±5.0257°. Accordingly the elliptical cross-sectional area of the "smeared out" (or "smoothed out") beams possesses a minor axis of 10.0514° and a major axis of 20.1028° (the latter being parallel to the x-axis direction). It should be understood that the second set of formations 106 could also have shapes other than sinusoidal. For example, a series of convex and concave cylindrical shapes could be used.

Additionally, although not described in detail, additional parameters may be refined to utilize total internal reflection whenever possible at reflection interfaces to maximize efficiency and reduce the need for costly mirror coatings and suppress the creation of stray dysfunctional rays.

Other embodiments may provide a shortened optical path required by the upper waveguide for color mixing by providing additional color mixing in the lower waveguide. Color mixing in the lower waveguide may be accomplished by lengthening the collimators and applying a transmissive refractive index matching material to adjacent, contacting side portions of the collimators. Additionally, color mixing in the lower waveguide may be accomplished by providing a monolithic collimator portion to replace the individual input sections 70 of the collimators 66 as described above. Further, the second reflector may modify other properties of the light besides the angle of incidence with the interface between the upper waveguide and the adhesive layer. For example, the second reflector, or optical modifier, could modify the polarization state of the light in a similar fashion such that the light is reflected by the interface on a first pass and transmitted by the interface on a second pass. It should be also understood that the various dimensions described above are merely exemplary, as the luminaire described above may also be implemented with dimensions that are considerably different. For example, the luminaire may be used in much larger systems, such as "theater-size" systems, and smaller systems, such as those often found in personal data assistants (PDAs).

Additionally, additional sequences of colors may be used in addition to that shown in FIG. 2. As will be appreciated by one skilled in the art, the repetition sequence of the colors shown in Figure may be represented as ". . . blue-green-red-green-blue-green-red-green-blue . . . ," which remains intact across the boundary between real and virtual collimators indicated in FIG. 2. To avoid color non-uniformity artifacts in the color sequence pattern of FIG. 2, the edge-overlapping collimators may be either a red or blue light-projecting collimator 66 rather than a green light-projecting collimator 66. This is because a color non-uniformity artifact for this chosen sequence of colors results if the overlapping collimator were green instead of blue or red. To illustrate this fact, consider the overlapping collimators to be green. Then the resulting pattern would be:

RED . . . GREEN . . . BLUE . . . GREEN . . . RED . . . GR(e)en . . . red . . . green . . . blue . . . green . . . red.

In the above representation, upper case letters represent real colors, lower case letters represent virtual colors, and the "(e)" represents the location of the overlap dividing plane central to a green color collimator. One can observe the resulting color non-uniformity artifact in that the repeating pattern is broken at the dividing plane that separates the real colors and virtual colors.

Alternative color sequence patterns that may be utilized in different embodiments of this invention may be tested by exercising the following general method for detecting whether or not color non-uniformity artifacts exist.

Three different real colors may be represented by upper case letters AA, BB, and CC, the corresponding three virtual colors are represented by lower case letters aa, bb, and cc, and ˆindicates the location of the boundary between real and virtual colors. Then the following artifact-free color sequences are possible:

AA . . . BB . . . CC . . . BB . . . AA . . . BB . . . Cc . . . bb . . . aa . . . bb . . . cc . . . bb . . . aa

CC . . . BB . . . AA . . . BB . . . CC . . . BB . . . Aa . . . bb . . . cc . . . bb . . . aa . . . bb . . . cc

AA . . . BB . . . CC . . . CC . . . BB . . . AA . . . AA . . . BB . . . CC . . . cc . . . bb . . . aa . . . aa . . . bb . . . cc . . . cc . . . bb . . . aa

However, the following three color sequence is not artifact-free:

AA . . . BB . . . CC . . . AA . . . BB . . . CC . . . Aa . . . cc . . . bb . . . aa . . . cc . . . bb . . . aa

Although not discussed in detail, steps may be taken to minimize moire effects, as is commonly understood, such as those described in U.S. Pat. No. 5,280,371 and U.S. Pat. No. 7,030,944. Additional discussion of methods for forming the upper adhesive layer may be found in U.S. Pat. No. 6,883,908. A discussion regarding a particular light source, used in one embodiment, may be found at http://www.lumileds.com/pdfs/AB27.PDF. A discussion regarding étendue as it relates to the size of the LEDs and the collimators and the thickness of the waveguide may be found at http://www.breault.com/resources/kbasePDF/wp_spie_032_axisymemetrical_concentrators.pdf.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A luminaire comprising:
a waveguide having first and second opposing ends and first and second substantially parallel opposing sides between the first and second opposing ends, the waveguide being configured to receive and internally reflect light having a first property and being devoid of a second property propagating from the first end to the second end on a first pass and direct at least a portion of the light propagating from the second end to the first end on a second pass with the second property through at least one of the first and second opposing sides; and
an optical modifier coupled to the second end of the waveguide and configured to reflect and modify the light propagating towards the second end of the waveguide such that the light propagates towards the first end of the waveguide with the second property,
wherein the extraction material comprises an extraction layer and an adhesive layer, the adhesive layer interconnecting the extraction layer and the waveguide such that the interface is formed between the adhesive layer and the waveguide, and wherein the adhesive layer comprises adhesive material portions and air gap portions, a ratio of an area of the adhesive material portions to an area of the air gap portions increasing as a function of distance from the optical modifier.

2. The luminaire of claim 1, wherein the light having the first property and being devoid of the second property propagates from the first end to the second end of the waveguide in a first direction and the light with the second property propagates from the second end to the first end of the waveguide in a second direction.

3. The luminaire of claim 2, further comprising an extraction material adjacent to one of the first and second opposing sides of the waveguide, the waveguide and the extraction material jointly forming an interface therebetween and configured such that the light propagating in the first direction is totally internally reflected by selected portions of the interface and light propagating in the second direction is transmitted by the selected portions of the interface and is directed through the at least one of the first and second opposing sides of the waveguide.

4. The luminaire of claim 3, wherein the first and second properties are at least one of a polarization state, a frequency, and an angle of incidence with the interface and further comprising a light source coupled to the waveguide and configured to direct the light having the first property and being devoid of the second property into the waveguide.

5. The luminaire of claim 4, wherein the extraction material is adjacent to the first side of the waveguide and the light propagating in the second direction and transmitted by the selected portions of the interface is directed through the second side of the waveguide.

6. The luminaire of claim 4, wherein the extraction material is adjacent to the second side of the waveguide and the light propagating in the second direction and transmitted by the selected portions of the interface is directed through the second side of the waveguide.

7. A luminaire comprising:
a support substrate;
a light source coupled to the support substrate;
a waveguide having first and second opposing ends and first and second opposing sides between the first and second opposing ends;
an extraction material adjacent to one of the first and second opposing sides of the waveguide and forming an interface between the waveguide and the extraction material, the waveguide and the extraction material being configured such that when light having a first property and being devoid of a second property enters the first end of the waveguide and propagates through the waveguide on a first pass in a first direction, substantially all of the light is internally reflected by selected portions of the interface;
a reflective body adjacent to the second end of the waveguide and configured to reflect and modify the light propagating through the waveguide in the first direction such that the light propagates through the waveguide on a second pass in a second direction with the second property, the waveguide and the extraction material being further configured such that at least a portion of the light propagating through the waveguide in the second direction with the second property is transmitted by the selected portions of the interface and is directed through at least one of the first and second opposing sides of the waveguide;
a collimator assembly coupled to the support substrate positioned to receive light emitted by the light source and configured to collimate the light as the light propagates therethrough, the waveguide being positioned over the collimator assembly; and
at least one optical component coupled to the support substrate and adjacent to a side of the collimator assembly opposite the light source and the first end of the waveguide, the at least one optical component being configured to direct the light propagating through the collimator assembly in substantially in a third direction away from the support substrate and redirect the light in the first direction over the collimator assembly and the light source.

8. The luminaire of claim 7, wherein the first and second properties are an angle of incidence with the interface.

9. The luminaire of claim 8, wherein the extraction material is adjacent to the first side of the waveguide and light propagating through the waveguide in the second direction with the second property is transmitted by the selected portions of the interface and is directed through the second side of the waveguide.

10. The luminaire of claim 8, wherein the extraction material is adjacent to the second side of the waveguide and light propagating through the waveguide in the second direction with the second property is transmitted by the selected portions of the interface and is directed through the second side of the waveguide.

11. The luminaire of claim 9, wherein the extraction material comprises a plurality of extraction features formed therein and the light that is transmitted by the selected portions of the interface is reflected by the plurality of extraction features in a third direction substantially perpendicular to the first and second directions.

12. The luminaire of claim 7, wherein the extraction material comprises an extraction layer and an adhesive layer, the adhesive layer interconnecting the extraction layer and the waveguide and the interface being formed between the adhesive layer and the waveguide and wherein the adhesive layer comprises adhesive material portions and air gap portions, a ratio of an area of the adhesive material portions to an area of the air gap portions increasing as a function of distance from the optical modifier.

13. The luminaire of claim 7, wherein the reflective body comprises a reflective surface having first and second sets of alternating raised and recessed formations thereon extending in respective first and second substantially perpendicular directions.

14. The luminaire of claim 7, wherein the first and second properties are an angle of incidence with the interface.

15. A luminaire comprising:
a waveguide having first and second opposing ends and first and second opposing sides between the first and second ends;
an extraction layer on one of the first and second opposing sides of the waveguide;
an adhesive layer between the waveguide and the extraction layer having a first end adjacent to the first end of the waveguide and a second end adjacent to the second end of the waveguide and forming an interface between the waveguide and the adhesive layer, the adhesive layer comprising adhesive material portions and air gap portions, a ratio of an area of the adhesive material portions to an area of the air gap portions increasing as a function of distance from one of the first and second ends thereof, the waveguide and the adhesive layer being configured such that when light propagates through the waveguide in a first direction, the light is totally internally reflected by the interface; and
a reflective body adjacent to at least one of the first and second ends of the waveguide and configured to reflect the light propagating through the waveguide in the first direction such that the light propagates through the waveguide in a second direction, the waveguide, the adhesive layer, and the extraction layer being further configured such that the light propagating through the waveguide in the second direction is transmitted by the interface and is directed through at least one of the first and second opposing sides of the waveguide.

16. The luminaire of claim 15, wherein the reflective body is further configured to modify the light such that the light propagating in the first direction has a first property and the light propagating in the second direction has a second property, the first and second properties being at least one of a polarization state, frequency, and an angle of incidence with the interface.

17. The luminaire of claim 16, wherein the extraction layer and the adhesive layer are on the first side of the waveguide and the light propagating through the waveguide in the second direction with the second property is transmitted by the interface and is directed through the second side of the waveguide.

18. The luminaire of claim 17, wherein the extraction layer and the adhesive layer are on the second side of the waveguide and the light propagating through the waveguide in the second direction with the second property is transmitted by the interface and is directed through the second side of the waveguide.

19. The luminaire of claim 18, wherein the extraction layer comprises a plurality of extraction features formed therein and the light that is transmitted by the interface is reflected by the plurality of extraction features in a third direction substantially perpendicular to the first and second directions.

20. A luminaire comprising:
a waveguide having first and second opposing ends and first and second opposing sides between the first and second opposing ends;
an extraction material adjacent to one of the first and second opposing sides of the waveguide and forming an interface between the waveguide and the extraction material, the waveguide and the extraction material being configured such that when light having a first property and being devoid of a second property enters the first end of the waveguide and propagates through the waveguide on a first pass in a first direction, substantially all of the light is internally reflected by selected portions of the interface; and
a reflective body adjacent to the second end of the waveguide and configured to reflect and modify the light propagating through the waveguide in the first direction such that the light propagates through the waveguide on a second pass in a second direction with the second property, the waveguide and the extraction material being further configured such that at least a portion of the light propagating through the waveguide in the second direction with the second property is transmitted by the selected portions of the interface and is directed through at least one of the first and second opposing sides of the waveguide,
wherein the reflective body comprises a reflective surface having first and second sets of alternating raised and recessed formations thereon extending in respective first and second substantially perpendicular directions.

* * * * *